(12) United States Patent
Akimoto et al.

(10) Patent No.: US 11,924,589 B2
(45) Date of Patent: Mar. 5, 2024

(54) IMAGING SYSTEM

(71) Applicant: Semiconductor Energy Laboratory Co., Ltd., Atsugi (JP)

(72) Inventors: Kengo Akimoto, Isehara (JP); Seiko Inoue, Atsugi (JP); Daichi Mishima, Hadano (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 92 days.

(21) Appl. No.: 17/779,717

(22) PCT Filed: Dec. 14, 2020

(86) PCT No.: PCT/IB2020/061874
§ 371 (c)(1),
(2) Date: May 25, 2022

(87) PCT Pub. No.: WO2021/130593
PCT Pub. Date: Jul. 1, 2021

(65) Prior Publication Data
US 2022/0417484 A1    Dec. 29, 2022

(30) Foreign Application Priority Data
Dec. 27, 2019    (JP) ................. 2019-237860

(51) Int. Cl.
*H04N 9/43*    (2006.01)
*G06T 3/40*    (2006.01)
(Continued)

(52) U.S. Cl.
CPC ............... *H04N 9/43* (2013.01); *G06T 7/90* (2017.01); *H04N 7/18* (2013.01); *H04N 9/67* (2013.01);
(Continued)

(58) Field of Classification Search
CPC ............ H04N 9/43; H04N 9/67; H04N 25/76; H04N 7/18; G06T 7/90;
(Continued)

(56) References Cited

U.S. PATENT DOCUMENTS 8,378,391 B2    2/2013 Koyama et al.
8,780,034 B2    7/2014 Kimura
(Continued)

FOREIGN PATENT DOCUMENTS

JP    2006-080746 A    3/2006
JP    2007-208481 A    8/2007
(Continued)

OTHER PUBLICATIONS

International Search Report (Application No. PCT/IB2020/061874) dated Mar. 23, 2021.
(Continued)

*Primary Examiner* — Marly S Camargo
(74) *Attorney, Agent, or Firm* — Eric J. Robinson; Robinson Intellectual Property Law Office, P.C.

(57) ABSTRACT

Color filters are used for color images obtained using imaging devices such as conventional image sensors. Imaging elements with color filters are sold, and an appropriate combination of the imaging element and a lens or the like is incorporated in an electronic device. Only providing a color filter to overlap a light-receiving region of an image sensor reduces the amount of light reaching the light-receiving region.

An imaging system of the present invention includes a solid-state imaging element without a color filter, a storage device, and a learning device. As a selection standard for reducing the amount of learning data, in an HSV color space, saturation is used, and selection is performed so that the saturation has optimal distribution. When colorization dis-
(Continued)

closed in this specification is performed, the colorization and object highlight processing can be performed at the same time.

4 Claims, 17 Drawing Sheets

(51) Int. Cl.
  *G06T 5/30* (2006.01)
  *G06T 7/90* (2017.01)
  *H04N 7/18* (2006.01)
  *H04N 9/67* (2023.01)
  *H04N 25/76* (2023.01)

(52) U.S. Cl.
  CPC ... *H04N 25/76* (2023.01); *G06T 2207/10024* (2013.01); *G06T 2207/20081* (2013.01); *G06T 2207/20084* (2013.01); *G06T 2207/30232* (2013.01)

(58) Field of Classification Search
  CPC . G06T 2207/10024; G06T 2207/20081; G06T 3/40; G06T 3/4046; G06T 3/4053; G06T 3/4061; G06T 5/30
  See application file for complete search history.

(56) References Cited

U.S. PATENT DOCUMENTS

| | | | |
|---|---|---|---|
| 8,916,869 B2 | 12/2014 | Koyama et al. | |
| 9,331,112 B2 | 5/2016 | Koyama et al. | |
| 9,343,018 B2 | 5/2016 | Kimura | |
| 9,773,814 B2 | 9/2017 | Koyama et al. | |
| 9,773,832 B2 | 9/2017 | Kurokawa | |
| 9,978,320 B2 | 5/2018 | Kimura | |
| 10,074,687 B2 | 9/2018 | Kurokawa | |
| 10,600,839 B2 | 3/2020 | Kurokawa | |
| 10,657,910 B2 | 5/2020 | Kimura | |
| 10,893,191 B2 | 1/2021 | Kadoi | |
| 10,964,743 B2 | 3/2021 | Kurokawa | |
| 11,030,966 B2 | 6/2021 | Kimura | |
| 11,212,543 B2 * | 12/2021 | Hwang | H04N 19/12 |
| 11,215,543 B1 * | 1/2022 | Qi et al. | H04N 19/42 |
| 11,302,726 B2 | 4/2022 | Kobayashi et al. | |
| 11,677,918 B2 * | 6/2023 | Ch0 | G06T 3/4015 |
| 2005/0243347 A1 * | 11/2005 | Hayaishi | H04N 1/40012 |
| | | | 358/1.9 |
| 2019/0199917 A1 | 6/2019 | Kadoi | |
| 2020/0226457 A1 | 7/2020 | Ikeda et al. | |
| 2020/0382730 A1 | 12/2020 | Kurokawa. et al. | |
| 2021/0092287 A1 | 3/2021 | Kadoi | |
| 2021/0233952 A1 | 7/2021 | Kurokawa | |
| 2021/0366421 A1 | 11/2021 | Kimura | |
| 2022/0224852 A1 * | 7/2022 | Kim | G06T 3/4046 |
| 2022/0417390 A1 * | 12/2022 | Akimoto | H04N 9/43 |
| 2023/0044180 A1 * | 2/2023 | Akimoto | G06V 10/82 |
| 2023/0059499 A1 * | 2/2023 | Toizumi | G06T 5/00 |

FOREIGN PATENT DOCUMENTS

| | | |
|---|---|---|
| JP | 2010-262276 A | 11/2010 |
| JP | 2011-119711 A | 6/2011 |
| JP | 2016-123087 A | 7/2016 |
| JP | 2019-117559 A | 7/2019 |
| JP | 2019-118098 A | 7/2019 |
| JP | 2019-128889 A | 8/2019 |
| WO | WO-2018/197984 | 11/2018 |

OTHER PUBLICATIONS

Written Opinion (Application No. PCT/IB2020/061874) dated Mar. 23, 2021.

* cited by examiner

FIG. 9A

| -1 | -1 | -1 |
|----|----|----|
| -1 | 8  | -1 |
| -1 | -1 | -1 |

FIG. 9B

| -1 | -1 | -1 |
|----|----|----|
| 0  | 0  | 0  |
| 1  | 1  | 1  |

FIG. 9C

| -1 | -2 | -1 |
|----|----|----|
| 0  | 0  | 0  |
| 1  | 2  | 1  |

FIG. 15A1
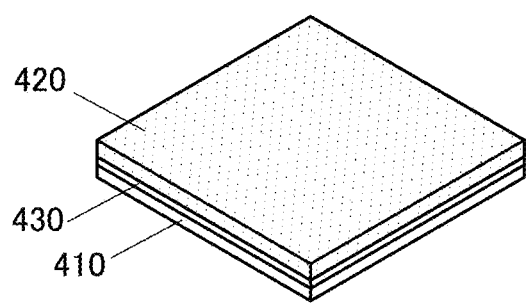
FIG. 15B1
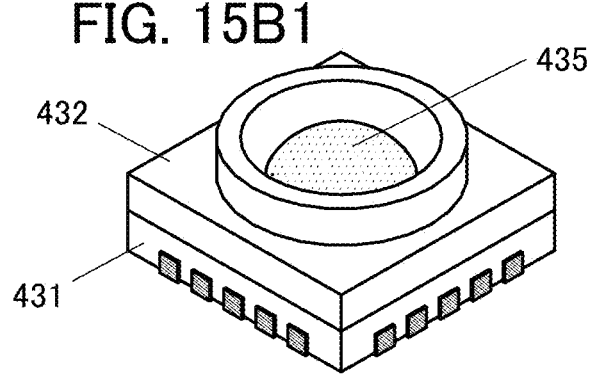
FIG. 15A2
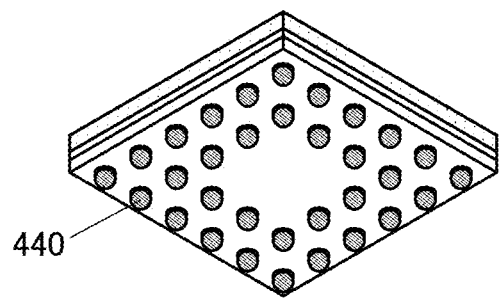
FIG. 15B2
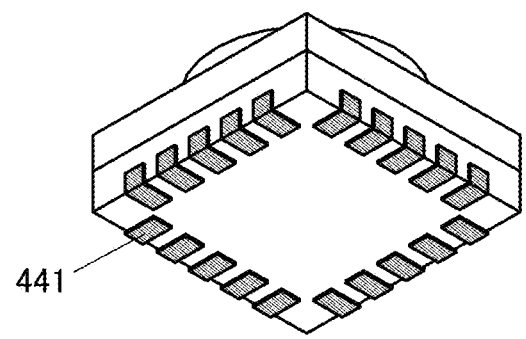
FIG. 15A3
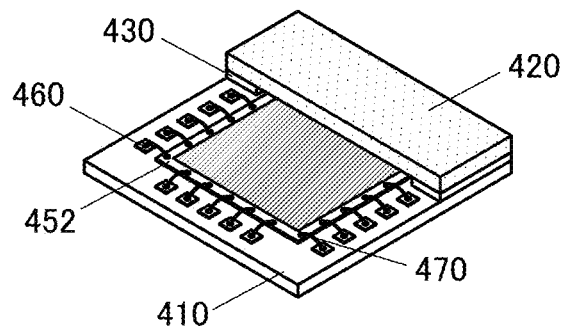
FIG. 15B3
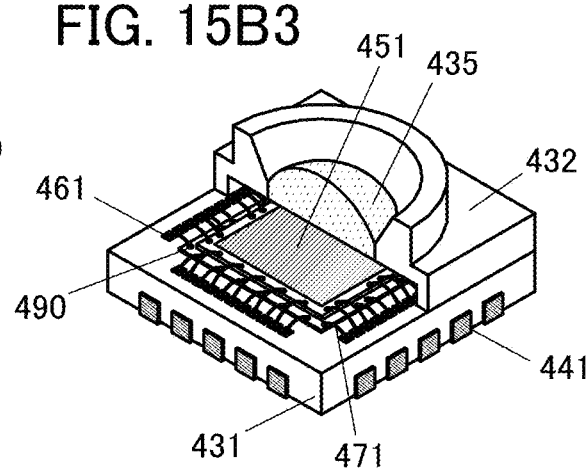

IMAGING SYSTEM

TECHNICAL FIELD

One embodiment of the present invention relates to a neural network and an imaging system using the neural network. Another embodiment of the present invention relates to an electronic device using a neural network. Another embodiment of the present invention relates to a vehicle using a neural network. Another embodiment of the present invention relates to an imaging system that obtains a color image by using an image processing technique from a monochrome image obtained in a solid-state imaging element. Another embodiment of the present invention relates to a video monitoring system or a security system using the imaging system, a safety information service system, or a driving assistance system.

Note that one embodiment of the present invention is not limited to the above technical field. One embodiment of the invention disclosed in this specification and the like relates to an object, a method, or a manufacturing method. One embodiment of the present invention relates to a process, a machine, manufacture, or a composition of matter. Therefore, specific examples of the technical field of one embodiment of the present invention disclosed in this specification and the like include a semiconductor device, a display device, a light-emitting device, a power storage device, a storage device, an electronic device, a lighting device, an input device, an input/output device, a driving method thereof, and a manufacturing method thereof.

Note that in this specification, a semiconductor device refers to any device that can function by utilizing semiconductor characteristics, and an electro-optical device, a semiconductor circuit, and an electronic device are all semiconductor devices.

BACKGROUND ART

A technique for performing colorization on an image taken by an image sensor by using a color filter has been conventionally known. Image sensors have been widely used as components of digital cameras, video cameras, and the like for imaging. In addition, image sensors are also used as part of security equipment such as security cameras; therefore, such equipment needs to perform accurate imaging not only in a bright place during the day but also a dark place at night or with low lighting and poor light, and the image sensors need to have a wide dynamic range.

In addition, considerable progress in techniques using AI (Artificial Intelligence) has been made, and for example, automatic coloring techniques where monochrome pictures using old photographic films are subjected to colorization by AI have been actively developed. For example, a technique where learning is performed using high-volume data to create a model and colorization is achieved by inference using the obtained generative model has been known as colorization by AI. Note that machine learning is part of AI.

In colorization, even when learning is performed with a larger amount of image data, an optimal image is not necessarily obtained. As the amount of image data to be learned becomes larger, an image becomes sepia or gray, so that coloring tends to be insufficient.

A technique for forming a transistor by using an oxide semiconductor thin film formed over a substrate has attracted attention. For example, an imaging device with a structure in which a transistor that includes an oxide semiconductor and has an extremely low off-state current is used in a pixel circuit is disclosed in Patent Document 1.

In addition, a technique for adding an arithmetic function to an imaging device is disclosed in Patent Document 2. Furthermore, a technique related to super-resolution processing is disclosed in Patent Document 3.

REFERENCE

Patent Documents

[Patent Document 1] Japanese Published Patent Application No. 2011-119711
[Patent Document 2] Japanese Published Patent Application No. 2016-123087
[Patent Document 3] Japanese Published Patent Application No. 2010-262276

SUMMARY OF THE INVENTION

Problems to be Solved by the Invention

Color filters are used for color images obtained using imaging devices such as conventional image sensors. Imaging elements with color filters are sold, and an appropriate combination of the imaging element and a lens or the like is incorporated in an electronic device. Only providing a color filter to overlap a light-receiving region of an image sensor reduces the amount of light reaching the light-receiving region. Accordingly, attenuation of the amount of received light by the color filter is inevitable. Different companies combine a variety of color filters with imaging elements for optimization. Transmitted light with a specific wavelength is not acquired, but broad light in a certain wavelength region is received.

For example, in the case of a dim evening, night, or a bad weather, it is difficult to recognize a distant object because of an insufficient amount of light in a camera incorporated in a vehicle. A driver is less likely to recognize an object in dark video; thus, colorization of the object is preferable because an emphasized image is obtained as a result.

For example, in a security camera used for a monitoring system or the like, the amount of light is insufficient during image taking in dim light; thus, there is a problem in that an image where a face can be recognized cannot be obtained. A person who sets the security camera prefers a color image to a monochrome image obtained using an infrared camera.

For example, there are many places where the amount of light is insufficient during image taking in the sea, and a light source is needed in deep-water places; however, in the case where an image of fish is to be taken, the fish might escape due to the light source. In addition, since light is less likely to be delivered in the sea, it is difficult to perform imaging of distant fish even with a light source.

An object is to provide an imaging method and an imaging system that obtain an image with high visibility and high fidelity of an actual color without using a color filter.

In particular, there is a problem in that in imaging in a dark place with little lighting, such as in the evening or at night, it is difficult to perform imaging of a clear image because the amount of received light is small. Accordingly, an image captured in a dark place is inferior to an image captured in a bright place in terms of visibility.

A security camera in an environment with light in a narrow wavelength region needs to precisely keep track of a situation in a captured image as a clue leading to an event, an accident, or the like; thus, the security camera needs to clearly grasp the feature of an object in the captured image. Accordingly, for example, in the case of a night-vision camera, it is important to perform imaging of an image with high visibility of an object by adjusting the focus on the object even in a dark place.

Among night-vision cameras, there is a camera that acquires color video through color separation with a special color filter using an infrared light source. However, since reflected light of infrared rays is used, there is a problem in that a color is not reflected or is represented by a different color depending on a photographic subject. This problem often occurs when the photographic subject is a material that absorbs infrared rays. For example, a human's skin is likely to be captured as a whiter image than the actual and a warm color such as yellow is sometimes captured in blue.

An object is to provide an imaging method and an imaging system that obtain an image with high visibility and high fidelity of the same color when there is external light even in imaging at night or in a dark place.

Means for Solving the Problems

An imaging system of the present invention includes a solid-state imaging element without a color filter, a storage device, and a learning device. Since the color filter is not used, light attenuation can be avoided, and highly sensitive imaging can be performed even with a small amount of light.

Since the color filter is not included, colorization is performed on obtained monochrome image data (analog data), and coloring is performed using an AI system. With the AI system, that is, the learning device using training data stored in the storage device, the focus can be adjusted by inference using an extracted feature value, and a highly visible color image (colored image data (digital data)) can be obtained even in imaging at night or in a dark place. Note that the learning device includes at least a neural network portion, performs not only learning but also inference, and can output data. In addition, the learning device sometimes performs inference using a learned feature value. In such a case, by storing the learned feature value in the storage device and performing arithmetic operation, the learning device can output data at a level similar to that when not using the learned feature value.

In addition, in the case where part of the edge of a photographic subject becomes unclear due to a small amount of light into the photographic subject, there is a possibility that a boundary cannot be determined and coloring of that portion is incomplete.

In view of this, it is preferable to use an image sensor without a color filter, acquire monochrome image data with a wide dynamic range, repeat super-resolution processing more than once, and then perform coloring by determination of a color boundary. In addition, super-resolution processing may be performed on training data at least once. Note that super-resolution processing refers to image processing for generating a high-resolution image from a low-resolution image.

In addition, in the case where image processing is performed using plural kinds of neural networks, the order in performing the image processing is also important. It is preferable to perform arithmetic processing using monochrome image data and perform colorization as final image processing. The data amount of monochrome image data is smaller than that of image data having color information, and a load on the processing capability of an arithmetic unit can be reduced.

Furthermore, when a learning model is prepared in advance, comparatively bright monochrome image data can be acquired by imaging without using a flash light source in a condition where the amount of light is insufficient, and vividly colored image data can be obtained through colorization based on the monochrome image data.

A structure of an invention disclosed in this specification is an imaging system that includes a solid-state imaging element without a color filter, a storage device, and a learning device. The solid-state imaging element acquires monochrome image data. Training data to be used in the learning device is converted into an HSV color space and is a second set obtained by thinning out based on statistics of a first set used as a median of a saturation histogram. The learning device performs colorization of the monochrome image data using training data stored in the storage device, and colored image data is created.

In the above structure, the solid-state imaging element is a back-illuminated CMOS image sensor chip.

In addition, in the case of an imaging system incorporated in a vehicle, only power limited to some extent can be used; thus, it is difficult to perform comparatively large-scale arithmetic operation or the like due to a CPU or the like incorporated in the vehicle. In particular, when the amount of learning data is huge, time or effort required for learning the learning data might be taken.

In this specification, a learning algorithm known as GAN (Generative Adversarial Network) is used for colorization learning.

For example, there is a learning data set (ILSVRC2012 (ImageNet Large Scale Visual Recognition Challenge 2012)) for colorization. This data set includes 26646 color images, which might lead to a huge amount of time for learning when being incorporated in the vehicle.

In addition, when colorization is performed with a neural network using this learning data, an image whose color is different from a natural color is obtained in many cases.

Accordingly, in the case where the ILSVRC2012 data set is used, not all the 26646 color images are used as the learning data, but selected color images are used so that an image whose color is close to a natural color is obtained. As a selection method, in the HSV color space, an S (saturation) histogram is used. The HSV color space is represented by three parameters of a hue, saturation, and brightness (Value). Since the HSV color space is a general color expression method, details are omitted here.

In the HSV color space, the saturation is represented by the distance from a center point of a hue circle, and its value ranges from 0 to 1.0. Note that a pure color is obtained when the saturation is 1.0, and vividness is lost and a gray color is obtained as a whole when the saturation is 0.

In the case where the ILSVRC2012 data set is used, classification is performed depending on the image saturation and a limitation is set in a statistically desirable range, so that the amount of learning data can be reduced and a vivid image that is close to a natural color can be output.

As a selection standard for reducing the amount of learning data, in the HSV color space, the saturation is used, and selection is performed so that the saturation has optimal distribution, which is a feature. When the data set is converted in accordance with the saturation standard, the learning data is selected using a certain standard, and the amount of data (the number of pictures) used for learning is reduced, learning can be performed in a short time, and a vivid image can be obtained compared to the case where all the learning data is used in colorization for obtaining a color image from a monochrome image.

Note that in this specification, a median of saturation histograms in all the pixels of one image is set as image saturation. The image saturation is normalized into 256 gray scales.

As a comparison, in the case where a saturation range is limited and colorization is performed using only biased learning data, for example, learning data with a saturation median of greater than or equal to 175 and less than or equal to 256, an output color image is also biased, which has an unnatural color. Even when only vivid image data with high saturation is simply used as the learning data, it has been difficult to perform vivid colorization.

A structure of another invention disclosed in this specification is a driving assistance system that includes a camera in a vehicle. The camera includes a solid-state imaging element without a color filter, a learning device, and a storage device. The solid-state imaging element performs imaging, and training data to be used in the learning device is converted into an HSV color space and is a second set obtained by thinning out based on statistics of a first set used as a median of a saturation histogram. A software program that creates colored image data by inference of the learning device is executed using training data of the storage device.

In addition, in each of the above structures, the set used as the median of the saturation histogram is classified into 256 gray scales, and data with greater than or equal to 175 gray scales is not used as training data. Furthermore, in each of the above structures, the second set can be less than or equal to one two hundred fiftieth of the first set.

A video monitoring system or a security system using the imaging system, or a safety information service system can clearly achieve imaging in a comparatively dark place.

Specifically, a monitoring system includes a security camera. The security camera includes a solid-state imaging element without a color filter, a learning device, and a storage device. The solid-state imaging element performs imaging while the security camera senses a person, and a software program that creates colored image data by inference of the learning device is executed using training data of the storage device.

In addition, the driving assistance system uses the camera incorporated in the vehicle, what is called an in-vehicle camera. The in-vehicle camera includes a solid-state imaging element without a color filter, a learning device, and a storage device. While the in-vehicle camera senses a distant object in a traveling direction, the solid-state imaging element performs imaging. A software program that creates colored image data by inference of the learning device is executed using learning data selected in advance. In the driving assistance system, it is preferable to perform colorization with a color that is more vivid than a natural color on an image obtained by the in-vehicle camera because driver's awareness is increased. Accordingly, when colorization disclosed in this specification is performed, the colorization and object highlight processing can be performed at the same time.

In addition, in the case where monochrome image colorization is executed by software, a program or the like may be installed from a network, a storage medium, or a computer in which a program that constructs software is incorporated in hardware. A program stored in a computer-readable storage medium such as a CD-ROM (Compact Disk Read Only Memory) is installed, and the program for monochrome image colorization is executed. Processing by the program is not necessarily performed in order or on the time series, and may be performed in parallel, for example.

Effect of the Invention

With an imaging system disclosed in this specification, a clear colorization image or a vivid colorization image can be obtained even when image taking is performed in a dim situation with a small amount of light.

Accordingly, in the case of a security camera, specifying a person (a face or the like) or identifying the feature of clothes can be performed comparatively easily on the basis of the obtained colorization image. When the imaging system is applied to the security camera, color display can be performed by capturing an image of a person's face in a dark place as monochrome image data, performing estimation and colorization, and outputting color image data to a display device.

In particular, in the case where 8K size input image data is obtained by a solid-state imaging element in order to increase the accuracy of imaging, the area of a light-receiving region provided in each pixel of the solid-state imaging element is narrowed; thus, the amount of obtained light is decreased. However, in the imaging system disclosed in this specification, there is no reduction in the amount of light due to a color filter because the color filter is not used for a solid-state imaging element. Accordingly, it is possible to perform imaging of 8K size image data with high sensitivity.

Furthermore, in the case of the in-vehicle camera, colorization and highlighted display can be performed at the same time by the imaging system disclosed in this specification.

BRIEF DESCRIPTION OF THE DRAWINGS

FIG. 9A to FIG. 9C are diagrams each illustrating a filter.

FIG. 15A1 to FIG. 15A3 and FIG. 15B1 to FIG. 15B3 are perspective views of a package and a module in which an imaging device is placed.

MODE FOR CARRYING OUT THE INVENTION

Figure 1:
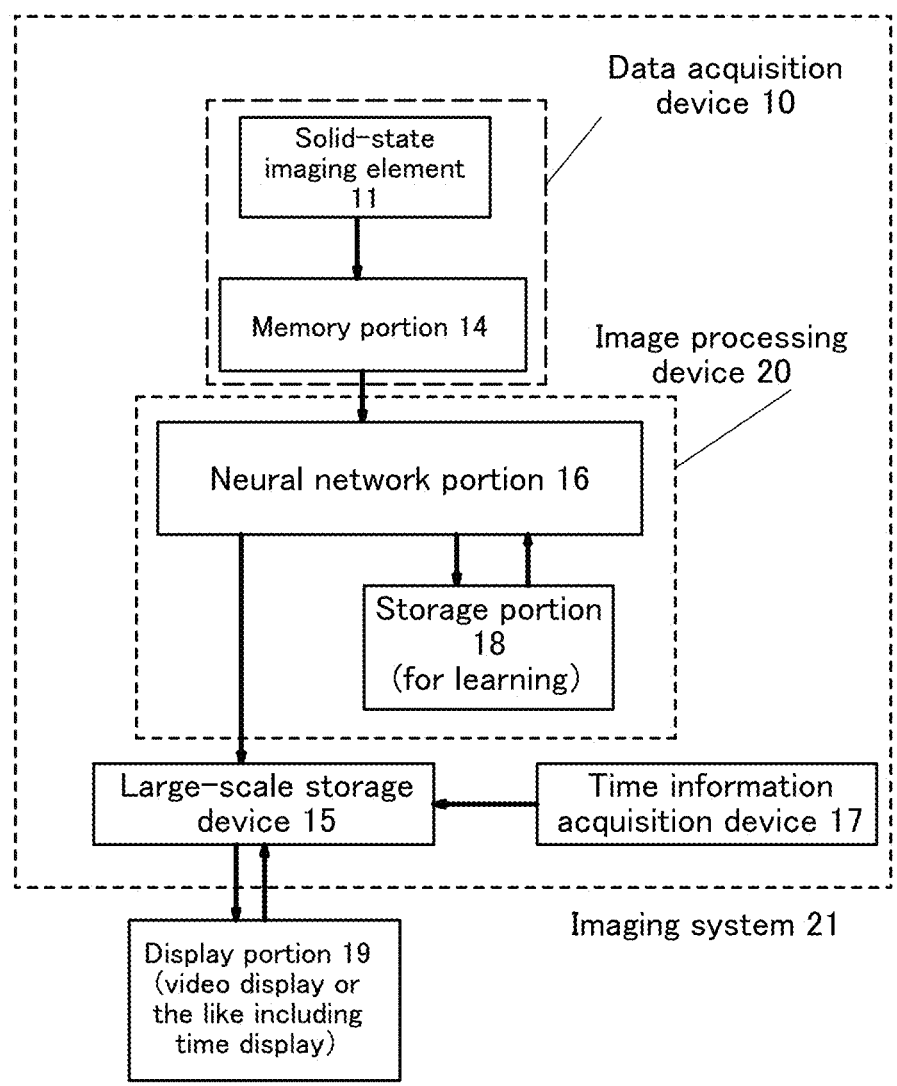
FIG. 1 is a block diagram illustrating one embodiment of the present invention.

Embodiments of the present invention will be described in detail below with reference to the drawings. Note that the present invention is not limited to the following description, and it is readily understood by those skilled in the art that modes and details of the present invention can be modified in various ways. In addition, the present invention should not be construed as being limited to the description of the following embodiments.

(Embodiment 1)

A structure example of an imaging system 21 used for a video monitoring system, a security system, or a driving assistance system is described with reference to a block diagram illustrated in FIG. 1.

A data acquisition device 10 is a semiconductor chip that includes a solid-state imaging element 11 and a memory portion 14 and does not include a color filter. The data acquisition device 10 includes an optical system such as a lens. Note that the optical system is not particularly limited as long as imaging characteristics are known, and an optical system with any structure may be employed.

For example, as the data acquisition device 10, one semiconductor chip where a back-illuminated CMOS image sensor chip, a DRAM chip, and a logic circuit chip are stacked may be used. In addition, one semiconductor chip where a back-illuminated CMOS image sensor chip and a logic circuit chip including an analog/digital converter circuit are stacked may be used. In that case, the memory portion 14 is an SRAM. Furthermore, chips to be stacked are stacked using a known bonding technology to achieve electrical connection.

The memory portion 14 is a circuit that stores digital data after conversion and has a structure in which data is stored before input to a neural network portion 16; however, the present invention is not limited to this structure.

An image processing device 20 is a device for estimating an edge or a color corresponding to a monochrome image obtained by the data acquisition device 10. The image processing device 20 executes image processing in different stages: a first stage for learning and a second stage for estimation. In this embodiment, the data acquisition device 10 and the image processing device 20 are formed as different devices; however, the data acquisition device 10 and the image processing device 20 can be formed to be integrated. In the case where the data acquisition device 10 and the image processing device 20 are formed to be integrated, a feature value obtained in the neural network portion can also be updated in a real time.

The neural network portion 16 is achieved by software calculation with a microcontroller. The microcontroller is obtained by incorporating a computer system into one integrated circuit (IC). When the calculation scale or data to be handled is large, a plurality of ICs are combined to form the neural network portion 16. A learning device includes at least the plurality of ICs. In addition, it is preferable to use a microcontroller incorporating Linux (registered trademark) that enables use of free software because the total cost of forming the neural network portion 16 can be reduced. Furthermore, another OS (operating system) may be used without being limited to Linux (registered trademark).

Learning of the neural network portion 16 illustrated in FIG. 1 is described below. In this embodiment, learning is performed in advance, and neural network processing is performed utilizing a weight. Training data for learning can be reduced; thus, the training data for learning can be stored in a storage portion 18 so that learning can also be performed as appropriate.

A free learning set (also referred to as a learning data set) is preferably used as data for learning because the total cost can be reduced.

In this embodiment, of ILSVRC2012 data, data whose amount is reduced by selection can be used.

An HSV color space is used for a data selection method. The HSV color space is preferable because it can perform numerical conversion in a state close to human's vision. A median when saturation histograms in all the pixels of one image are made is set as image saturation, and the image saturation is normalized into 256 gray scales.

Figure 2A:
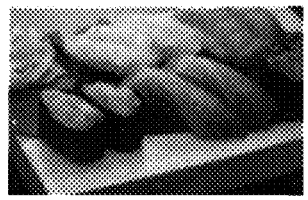
FIG. 2A shows an example of image data.
Figure 2B:
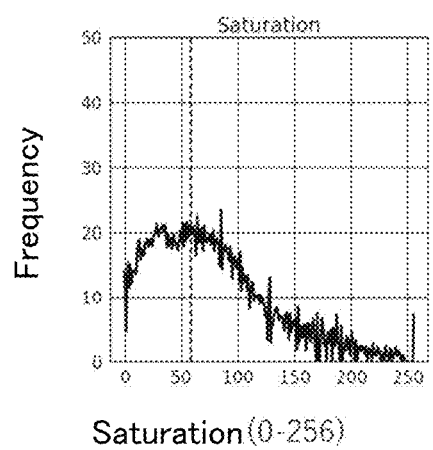
FIG. 2B is a graph showing saturation obtained by normalization of a color image whose saturation median is 58, where a vertical axis represents frequency and a horizontal axis represents 256 gray scales.
Figure 2C:
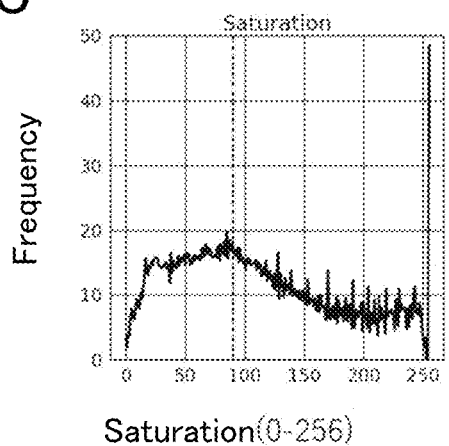
FIG. 2C is a graph showing saturation obtained by normalization of a color image whose saturation median is 90, where a vertical axis represents frequency and a horizontal axis represents 256 gray scales.

Here, an example of normalized data is described. FIG. 2A shows one monochrome image. A result of making a histogram of the monochrome image in FIG. 2A colored in a first condition corresponds to FIG. 2B. In addition, a result of making a histogram of the image in FIG. 2A colored in a second condition that is different from the first condition corresponds to FIG. 2C.

Note that the image obtained in the second condition can be perceived as a more vivid image for human's eyes, and a higher median of the histogram can be numerically converted into a more vivid image.

Figure 3:
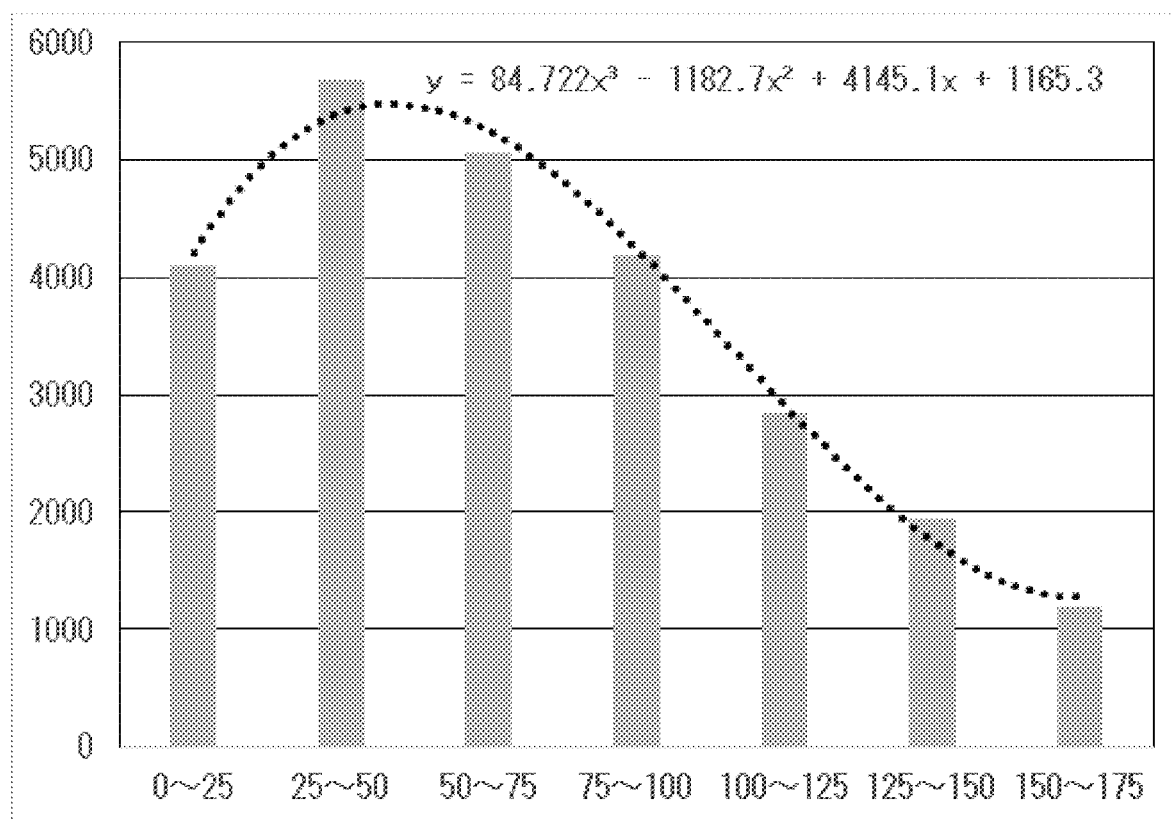
FIG. 3 is a diagram showing a graph where a vertical axis represents the number of images and a horizontal axis represents classified gray scale levels and an approximate curve.

FIG. 3 shows results obtained by normalization using the above method and classification of the ILSVRC2012 data according to image saturation. Classification is performed by setting saturation medians for every 25 gray scale levels. Table 1 also shows the results.

TABLE 1

| Gray scale level | The number of images |
|---|---|
| 0-25 | 4108 |
| 25-50 | 5687 |
| 50-75 | 5066 |
| 75-100 | 4193 |
| 100-125 | 2848 |
| 125-150 | 1952 |
| 150-175 | 1205 |
| 175-256 | 1597 |
| Total | 26656 |

In addition, when the classification is performed, an approximate curve can be obtained from these data. FIG. 3 shows an approximate curve. When each range (class) of gray scale levels is selected based on this approximate curve, the number of images used for learning can be thinned out and reduced. Table 2 shows an example of the total number of images used for learning.

TABLE 2

| Gray scale level | The total number of images | | | | |
|---|---|---|---|---|---|
| | 25059 | 10000 | 5000 | 1000 | 100 |
| 0-25 | 4212 | 1681 | 840 | 168 | 17 |
| 25-50 | 5402 | 2156 | 1078 | 216 | 22 |
| 50-75 | 5244 | 2093 | 1046 | 209 | 21 |
| 75-100 | 4245 | 1694 | 847 | 169 | 17 |
| 100-125 | 2914 | 1163 | 581 | 116 | 12 |
| 125-150 | 1759 | 702 | 351 | 70 | 7 |
| 150-175 | 1289 | 514 | 257 | 51 | 5 |

As shown in Table 2, data with greater than or equal to 175 and less than or equal to 256 are deleted and classifications of other data are obtained from an approximate curve. For example, in the case where the total number of images is ten thousand, selection is performed for each class. In the case where the total number of images is 100 (approximately one two hundred fiftieth), 17 images with gray scale levels of greater than or equal to 0 and less than 25, 22 images with gray scale levels of greater than or equal to 25 and less than 50, 21 images with gray scale levels of greater than or equal to 50 and less than 75, 17 images with gray scale levels of greater than or equal to 75 and less than 100, 12 images with gray scale levels of greater than or equal to 100 and less than 125, 7 images with gray scale levels of greater than or equal to 125 and less than 150, and 5 images with gray scale levels of greater than or equal to 150 and less than 175 are used. In addition, the proportion can be selected by percentage on the basis of a numerical value when the total number of images is 100. Furthermore, these numbers are references, and the number of images is within a range of 0.5 times or twice each class.

The learning device performs inference by using the training data for learning. The learning device may have any structure as long as it can perform inference by using the training data of the storage portion 18 on the basis of monochrome image data to output colored image data. In the case where a learned feature value is used, the amount of data and the amount of arithmetic operation are reduced; thus, there is an advantage in that the learning device can be formed with a small-scale structure, for example, with one or two ICs.

The following convolutional neural network (also referred to as an artificial neural network) can be used for colorization.

A program is created using python under operating environments of Linux (registered trademark). GAN (Generative Adversarial Networks) where the neural network is used as Generator is used.

Output data of the neural network portion 16 is linked to time data of a time information acquisition device 17 and is stored in a large-scale storage device 15. Data obtained from the start of imaging is accumulated and stored in the large-scale storage device 15. Note that the large-scale storage device 15 refers not to a large server but to a compact large-capacity storage device (for example, an SSD or a hard disk) that can be incorporated in a monitoring device of a security camera or a vehicle, for example. A device that acquires time information from a GPS may be used as the time information acquisition device 17.

A display portion 19 may include an operation input portion such as a touch panel so that a user can select data from the data stored in the large-scale storage device 15 and observe the data as appropriate. The imaging system 21 can be used as a video monitoring system, a security system, or a driving assistance system.

In addition, a display portion of a user's portable information terminal (a smartphone or the like) can be the display portion 19. When the display portion of the portable information terminal accesses to the large-scale storage device 15, monitoring can also be performed regardless of user's whereabouts.

The location where the imaging system 21 is placed is not limited to a room wall. When all or part of the structure of the imaging system 21 is incorporated in an unmanned aerial vehicle (also referred to as a drone) provided with a rotor blade, video taken from the air can also be monitored. In particular, imaging can be performed under an environment with a small amount of light, such as lighting of a road lamp in the evening or at night.

In addition, although the video monitoring system or the security system is described in this embodiment, there is no particular limitation. When a camera for imaging of vehicle surroundings or a radar is combined with an ECU (Electronic Control Unit) for image processing or the like, the present invention can also be applied to a vehicle capable of semi-automatic operation or a vehicle capable of full automatic operation. A vehicle using an electric motor includes a plurality of ECUs, and motor control and the like are performed by the ECUs. The ECU includes a microcomputer. The ECU is connected to a CAN (Controller Area Network) provided in the electric vehicle. The CAN is a type of a serial communication standard used as an in-vehicle LAN. For the ECU, a CPU or a GPU is used. For example, a structure may be employed in which a solid-state imaging element without a color filter is used as one of a plurality of cameras (dashboard cameras, rear cameras, and the like) incorporated in an electric vehicle so that inference of an obtained monochrome image can be performed in the ECU through the CAN and a colorization image can be created and displayed by an in-vehicle display device or the display portion of the portable information terminal.

(Embodiment 2)

Figure 4:
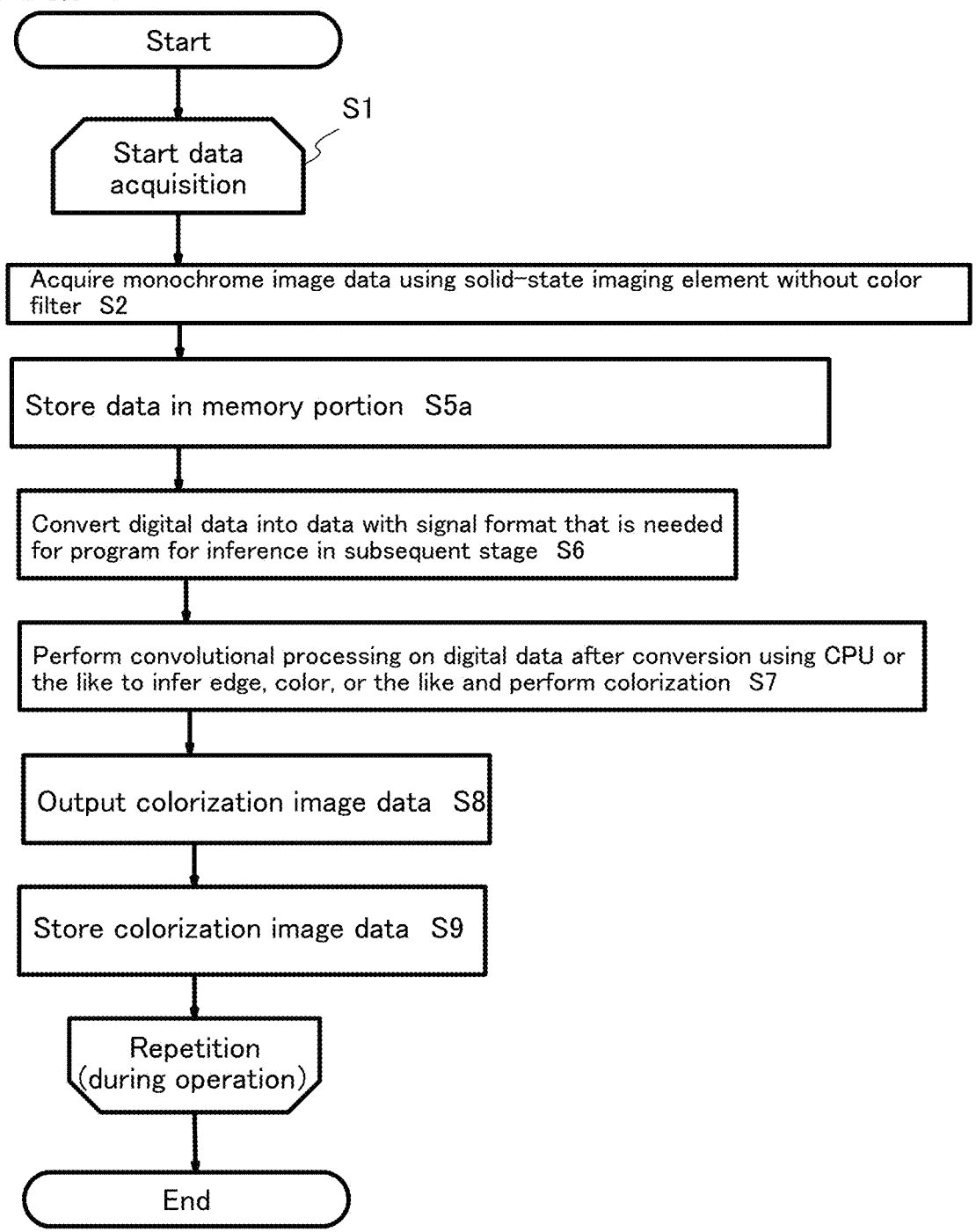
FIG. 4 is an example of a flow chart showing one embodiment of the present invention.

In this embodiment, FIG. 4 illustrates an example of a flow of performing colorization on monochrome video obtained by the solid-state imaging element 11 using the block diagram and the program described in Embodiment 1.

A solid-state imaging element without a color filter is provided in a location where an image of a region to be monitored can be taken (a vehicle hood, a vehicle ceiling, or the like), and the imaging system 21 described in Embodiment 1 is placed and activated so that continuous shooting is started.

First, preparation for data acquisition is started and data acquisition is started (S1).

Monochrome image data is acquired using the solid-state imaging element without a color filter (S2).

Next, the monochrome image data is stored in the memory portion 14 (a digital memory portion) (S5a). Storing the monochrome image data makes data capacity smaller than storing a color image as it is.

Next, digital data (the monochrome image data) is converted into data with a signal format (JPEG (registered trademark) or the like) that is needed for a program for inference in a subsequent stage (S6).

Next, the digital data after conversion is subjected to convolutional processing by using a CPU or the like, inference of an edge, a color, or the like is performed, and colorization is performed (S7). Instead of the CPU, one integrated IC chip including a GPU (Graphics Processing Unit), a PMU (Power Management Unit), or the like may be used. Then, colorization image data is output (S8). After that, the colorization image data as well as time data such as date and time is stored (S9). For storage, the data is accumulated in the large-scale storage device 15, i.e., what is called a large-capacity storage device (a hard disk or the like) or a database.

As learning data for colorization, a selected learning data set is used as described in Embodiment 1. Owing to the selection method described in Embodiment 1, the time required for learning the learning data can be significantly reduced. In addition, even when the amount of learning data is small, a more vivid image can be obtained by colorization, which corresponds to highlighted display. Compared to a dark captured image with a narrow dynamic range when using a conventional imaging element with a color filter, an image obtained in this embodiment is highlighted, so that display suitable for a driving assistance system can be performed.

Acquisition of the colorization image data is repeated. Owing to the repetitive acquisition of the colorization image data, real-time colorization can also be performed.

The thus obtained colorization image data uses an imaging element without a color filter and is based on a monochrome image with a wide dynamic range; thus, even in the case where a conventional imaging element with a color filter cannot perform identification because of a small amount of light, identifiable colorization image data can be obtained. The imaging system described in this embodiment makes one or more computers achieve the above-described respective steps (S1 to S9).

(Embodiment 3)

In this embodiment, an example is described in which smooth image processing or fine coloring processing as compared to the colorization image data obtained in Embodiment 2 can be performed.

Figure 5:
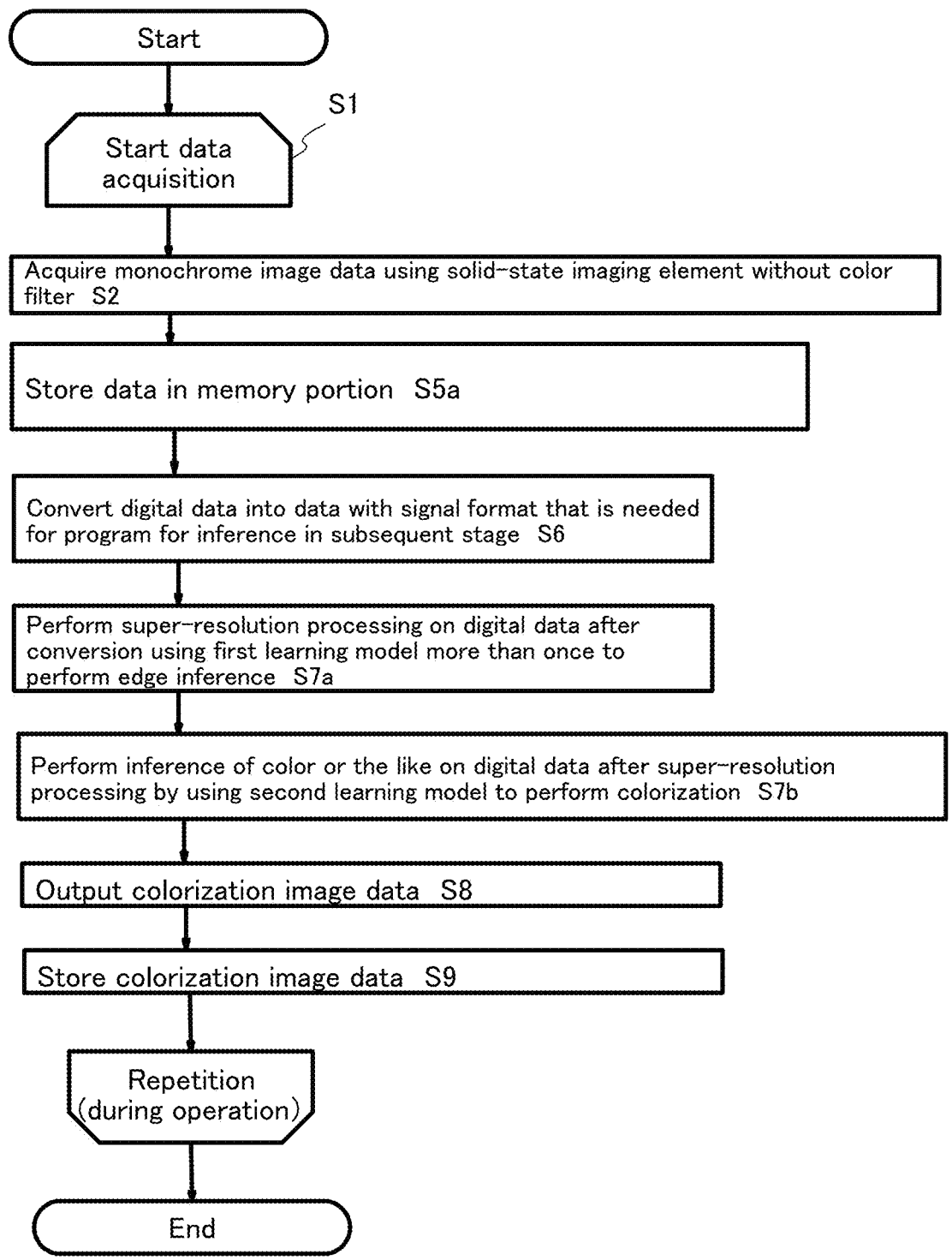
FIG. 5 is an example of a flow chart showing one embodiment of the present invention.

FIG. 5 shows a flow chart. Note that the same reference numerals are used for steps that are the same as those in the flow chart shown in FIG. 4 in Embodiment 2. Since S1 to S6 and S8 to S9 in FIG. 4 are the same as those in FIG. 5, detailed descriptions are omitted here.

As shown in FIG. 5, after step S6, digital data after conversion is subjected to super-resolution processing using a first learning model more than once so that edge inference is performed (S7a).

Then, the digital data after super-resolution processing is subjected to inference of a color or the like by using a second learning model so that colorization is performed (S7b). Subsequent steps are the same as those in Embodiment 2.

With the method described in Embodiment 1, the amount of training data for obtaining a color image that can reach certain criteria can be reduced, the time required for machine learning can be shortened, and the structure of a neural network portion can be simplified. Note that the neural network portion is part of machine learning. In addition, deep learning is part of the neural network portion.

The edge of colorization image data obtained in this embodiment becomes smoother than the image data in Embodiment 2, and optimal colorization is performed.

This embodiment can be freely combined with Embodiment 1 or Embodiment 2.

(Embodiment 4)

Figure 6:
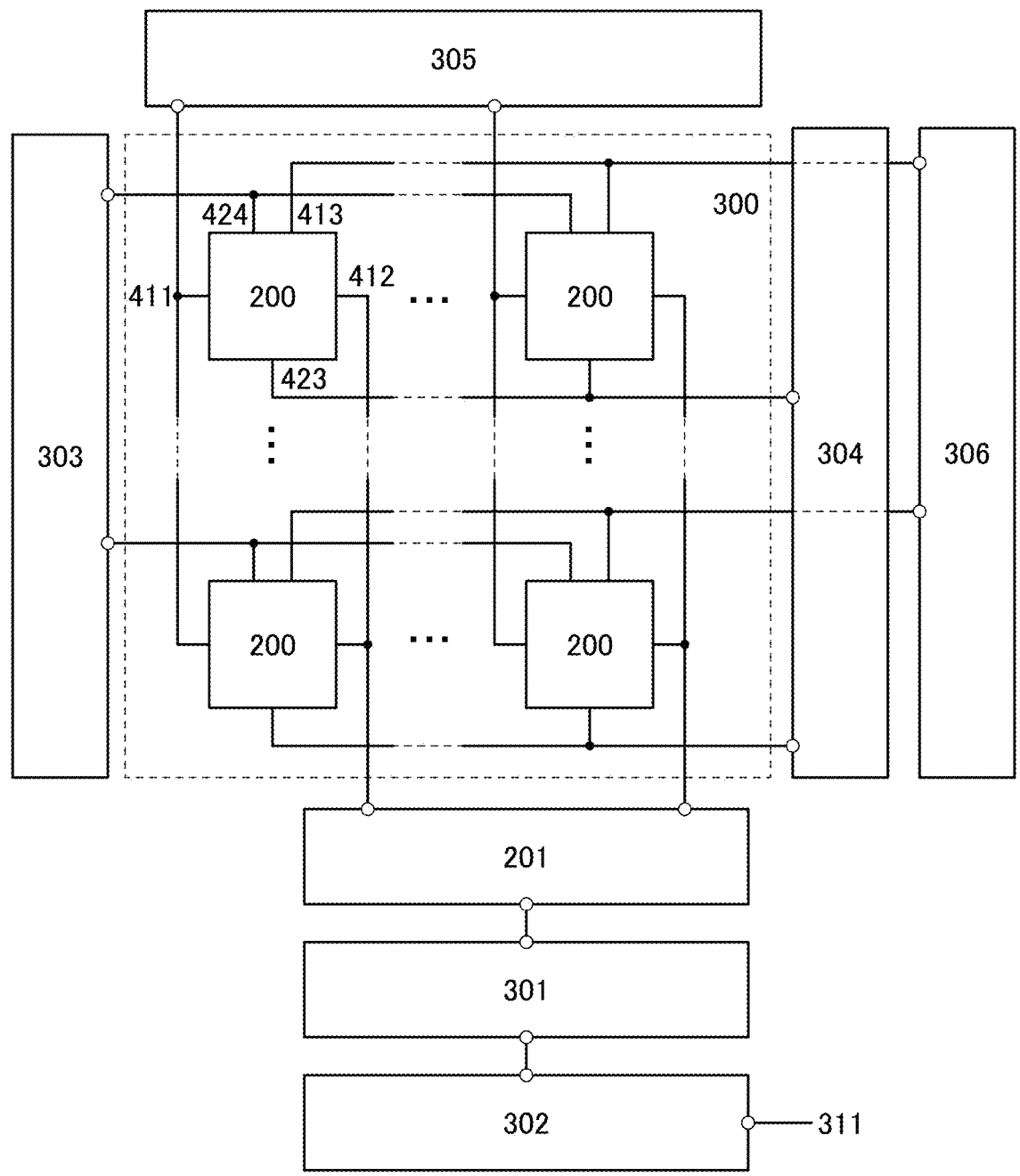
FIG. 6 is a block diagram illustrating a structure example of an imaging portion.

In this embodiment, a structure example of an imaging portion is described below as the data acquisition device 10. FIG. 6 is a block diagram illustrating the imaging portion.

The imaging portion includes a pixel array 300, a circuit 201, a circuit 301, a circuit 302, a circuit 303, a circuit 304, a circuit 305, and a circuit 306. Note that each of the structures of the circuit 201 and the circuit 301 to the circuit 306 is not limited to a single circuit structure and is sometimes composed of a combination of a plurality of circuits. Alternatively, any of the plurality of circuits described above may be combined. Furthermore, a circuit other than the above circuits may be connected.

The pixel array 300 has an imaging function and an arithmetic function. The circuit 201 and the circuit 301 each have an arithmetic function. The circuit 302 has an arithmetic function or a data conversion function. The circuit 303, the circuit 304, and the circuit 306 each have a selection function. The circuit 303 is electrically connected to a pixel block 200 through a wiring 424. The circuit 304 is electrically connected to the pixel block 200 through a wiring 423. The circuit 305 has a function of supplying a potential for product-sum operation to a pixel. As a circuit having a selection function, a shift register, a decoder, or the like can be used. The circuit 306 is electrically connected to the pixel block 200 through a wiring 413. Note that the circuit 301 and the circuit 302 may be provided outside.

Figure 7:
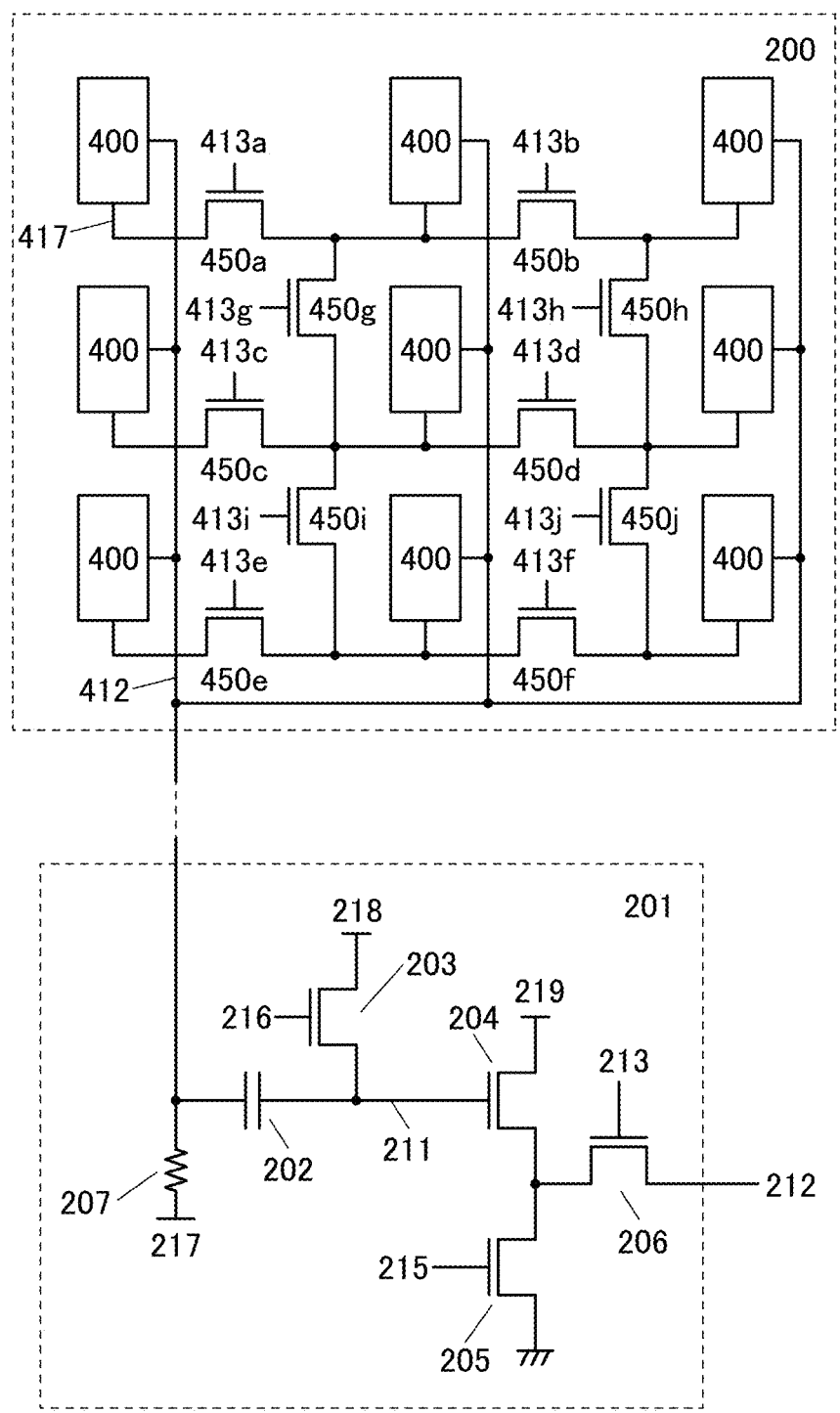
FIG. 7 is a diagram illustrating structure examples of a pixel block 200*I* and a circuit 201.

The pixel array 300 includes a plurality of pixel blocks 200. As illustrated in FIG. 7, the pixel block 200 includes a plurality of pixels 400 arranged in a matrix, and each of the pixels 400 is electrically connected to the circuit 201 through a wiring 412. Note that the circuit 201 can also be provided in the pixel block 200.

Furthermore, the pixels 400 are electrically connected to adjacent pixels 400 through transistors 450 (a transistor 450a to a transistor 450j). The functions of the transistors 450 are described later.

The pixels 400 can acquire image data and generate data obtained by adding the image data and a weight coefficient. Note that the number of pixels included in the pixel block 200 is 3×3 in an example illustrated in FIG. 7 but is not limited to this. For example, the number of pixels can be 2×2, 4×4, or the like. Alternatively, the number of pixels in a horizontal direction and the number of pixels in a vertical direction may differ from each other.

Furthermore, some pixels may be shared by adjacent pixel blocks. Although ten transistors 450 (transistors 450a to 450j) are provided between the pixels 400 in the examples illustrated in FIG. 7, the number of transistors 450 may be further increased. In addition, in the transistors 450g to 450j, some transistors may be omitted so that a parallel path is canceled. Wirings 413g to 413j are respectively connected to the transistors 450g to 450j as gates.

The pixel block 200 and the circuit 201 can operate as a product-sum operation circuit.

Figure 8:
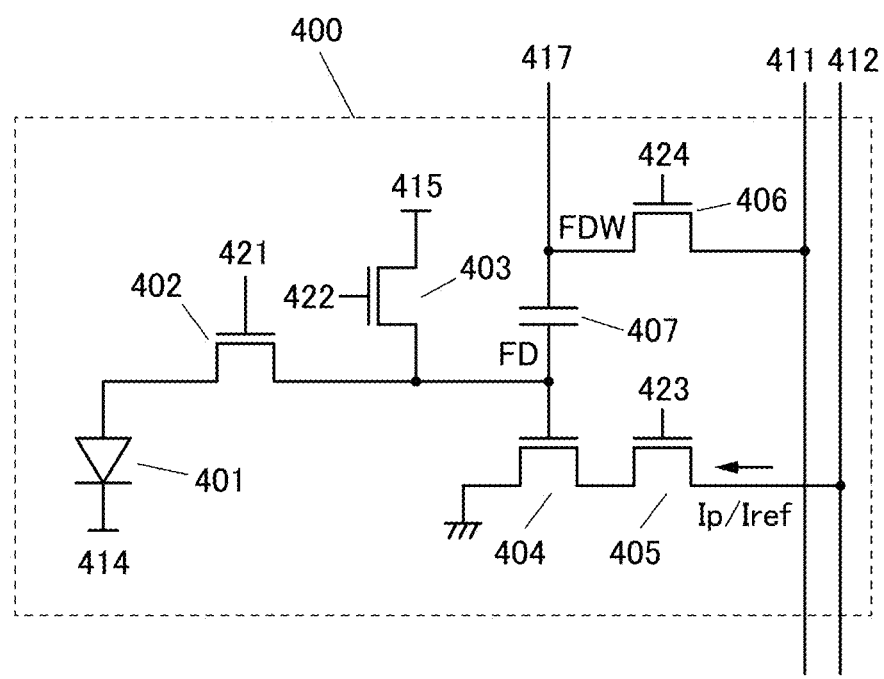
FIG. 8 is a diagram illustrating a pixel structure example.

As illustrated in FIG. 8, the pixel 400 can include a photoelectric conversion device 401, a transistor 402, a transistor 403, a transistor 404, a transistor 405, a transistor 406, and a capacitor 407.

One electrode of the photoelectric conversion device 401 is electrically connected to one of a source and a drain of the transistor 402. The other of the source and the drain of the transistor 402 is electrically connected to one of a source and a drain of the transistor 403, a gate of the transistor 404, and one electrode of the capacitor 407. One of a source and a drain of the transistor 404 is electrically connected to one of a source and a drain of the transistor 405. The other electrode of the capacitor 407 is electrically connected to one of a source and a drain of the transistor 406.

The other electrode of the photoelectric conversion device 401 is electrically connected to a wiring 414. The other of the source and the drain of the transistor 403 is electrically connected to a wiring 415. The other of the source and the drain of the transistor 405 is electrically connected to the wiring 412. The other of the source and the drain of the transistor 404 is electrically connected to a GND wiring or the like. The other of the source and the drain of the transistor 406 is electrically connected to a wiring 411. The other electrode of the capacitor 407 is electrically connected to a wiring 417.

A gate of the transistor 402 is electrically connected to a wiring 421. A gate of the transistor 403 is electrically connected to a wiring 422. A gate of the transistor 405 is electrically connected to the wiring 423. A gate of the transistor 406 is electrically connected to the wiring 424.

Here, a point where the other of the source and the drain of the transistor 402, the one of the source and the drain of the transistor 403, the one electrode of the capacitor 407, and the gate of the transistor 404 are electrically connected is referred to as a node FD. Furthermore, a point where the other electrode of the capacitor 407 and the one of the source and the drain of the transistor 406 are electrically connected is referred to as a node FDW.

The wiring 414 and the wiring 415 can each have a function of a power supply line.

For example, the wiring 414 can function as a high potential power supply line, and the wiring 415 can function as a low potential power supply line. The wiring 421, the wiring 422, the wiring 423, and the wiring 424 can function as signal lines that control the conduction of the respective transistors. The wiring 411 can function as a wiring for supplying a potential corresponding to a weight coefficient to the pixel 400. The wiring 412 can function as a wiring that electrically connects the pixel 400 and the circuit 201. The wiring 417 can function as a wiring that electrically connects the other electrode of the capacitor 407 of the pixel 400 and the other electrode of the capacitor 407 of another pixel 400 through the transistor 450 (see FIG. 7).

Note that an amplifier circuit or a gain control circuit may be electrically connected to the wiring 412.

As the photoelectric conversion device 401, a photodiode can be used. There is no limitation on types of photodiodes, and it is possible to use a Si photodiode in which a photoelectric conversion layer contains silicon, an organic photodiode in which a photoelectric conversion layer includes an organic photoconductive film, or the like. Note that in order to increase light detection sensitivity under low illuminance conditions, an avalanche photodiode is preferably used.

The transistor 402 can have a function of controlling the potential of the node FD.

The transistor 403 can have a function of initializing the potential of the node FD. The transistor 404 can have a function of controlling current fed by the circuit 201 in accordance with the potential of the node FD. The transistor 405 can have a function of selecting a pixel. The transistor 406 can have a function of supplying the potential corresponding to the weight coefficient to the node FDW.

In the case where an avalanche photodiode is used as the photoelectric conversion device 401, high voltage is sometimes applied and thus a transistor with high breakdown voltage is preferably used as a transistor connected to the photoelectric conversion device 401. As the transistor with high breakdown voltage, a transistor using a metal oxide in its channel formation region (hereinafter an OS transistor) or the like can be used, for example. Specifically, an OS transistor is preferably employed as the transistor 402.

An OS transistor also has a feature of extremely low off-state current. When OS transistors are used as the transistor 402, the transistor 403, and the transistor 406, the charge retention period of the node FD and the node FDW can be lengthened greatly. Therefore, a global shutter mode in which charge accumulation operation is performed in all the pixels at the same time can be employed without complicating the circuit structure and the operation method. Furthermore, while image data is retained at the node FD, arithmetic operation using the image data can be performed more than once.

Meanwhile, it is sometimes desirable that the transistor 404 have excellent amplifying characteristics. In addition, a transistor having high mobility capable of high-speed operation is sometimes preferably used as the transistor 406. Accordingly, transistors using silicon in their channel formation regions (hereinafter Si transistors) may be employed as the transistor 404 and the transistor 406.

Note that without limitation to the above, an OS transistor and a Si transistor may be freely employed in combination. Alternatively, all the transistors may be OS transistors. Alternatively, all the transistors may be Si transistors. Examples of Si transistors include a transistor including amorphous silicon, a transistor including crystalline silicon (microcrystalline silicon, low-temperature polysilicon, or single crystal silicon), and the like.

The potential of the node FD in the pixel 400 is determined by the potential obtained by adding a reset potential supplied from the wiring 415 and a potential (image data) generated by photoelectric conversion by the photoelectric conversion device 401. Alternatively, the potential of the node FD in the pixel 400 is determined by capacitive coupling of the potential corresponding to a weight coefficient supplied from the wiring 411. Thus, current corresponding to data in which a given weight coefficient is added to the image data can flow through the transistor 405.

Note that the circuit structures of the pixel 400 described above are examples, and the photoelectric conversion operation can also be performed with other circuit structures.

As illustrated in FIG. 7, the pixels 400 are electrically connected to each other through the wiring 412. The circuit 201 can perform arithmetic operation using the sum of currents flowing through the transistors 404 of the pixels 400.

The circuit 201 includes a capacitor 202, a transistor 203, a transistor 204, a transistor 205, a transistor 206, and a resistor 207.

One electrode of the capacitor 202 is electrically connected to one of a source and a drain of the transistor 203. The one of the source and the drain of the transistor 203 is electrically connected to a gate of the transistor 204. One of a source and a drain of the transistor 204 is electrically connected to one of a source and a drain of the transistor 205. The one of the source and the drain of the transistor 205 is electrically connected to one of a source and a drain of the transistor 206. One electrode of the resistor 207 is electrically connected to the other electrode of the capacitor 202.

The other electrode of the capacitor 202 is electrically connected to the wiring 412.

The other of the source and the drain of the transistor 203 is electrically connected to a wiring 218. The other of the source and the drain of the transistor 204 is electrically connected to a wiring 219. The other of the source and the drain of the transistor 205 is electrically connected to a reference power supply line such as a GND wiring. The other of the source and the drain of the transistor 206 is electrically connected to a wiring 212. The other electrode of the resistor 207 is electrically connected to a wiring 217.

The wiring 217, the wiring 218, and the wiring 219 can each have a function of a power supply line. For example, the wiring 218 can have a function of a wiring that supplies a potential dedicated to reading. The wiring 217 and the wiring 219 can function as high potential power supply lines. The wiring 213, the wiring 215, and the wiring 216 can function as signal lines for controlling the conduction of the respective transistors. The wiring 212 is an output line and can be electrically connected to the circuit 301 illustrated in FIG. 6, for example.

The transistor 203 can have a function of resetting the potential of the wiring 211 to the potential of the wiring 218. The wiring 211 is a wiring that is electrically connected to the one electrode of the capacitor 202, the one of the source and the drain of the transistor 203, and the gate of the transistor 204. The transistor 204 and the transistor 205 can have a function of a source follower circuit. The transistor 206 can have a function of controlling reading. The circuit 201 has a function of a correlated double sampling circuit (a CDS circuit) and can be replaced with a circuit having the function and another structure.

In one embodiment of the present invention, offset components other than the product of image data (X) and a weight coefficient (W) are eliminated, and an objective WX is extracted.

WX can be calculated using data obtained when imaging is performed, data obtained when imaging is not performed, and data obtained by adding weights to the respective data.

The total amount of currents ($I_p$) flowing through the pixels 400 when imaging is performed is $k\Sigma(X-V_{th})^2$, and the total amount of currents ($I_p$) flowing through the pixels 400 when weights are added is $k\Sigma(W+X-V_{th})^2$. In addition, the total amount of currents ($I_{ref}$) flowing through the pixels 400 when imaging is not performed is $k\Sigma(0-V_{th})^2$, and the total amount of currents ($I_{ref}$) flowing through the pixels 400 when weights are added is $k\Sigma(W-V_{th})^2$. Here, k is a constant and $V_{th}$ is the threshold voltage of the transistor 405.

First, a difference (data A) between the data obtained when imaging is performed and the data obtained by adding a weight to the data is calculated. The difference is $k\Sigma((X-V_{th})^2-(W+X-V_{th})^2)=k\Sigma(-W^2-2W\cdot X+2W\cdot V_{th})$.

Next, a difference (data B) between the data obtained when imaging is not performed and the data obtained by adding a weight to the data is calculated. The difference is $k\Sigma((0-V_{th})^2-(W-V_{th})^2)=k\Sigma(-W^2+2W\cdot V_{th})$.

Then, a difference between the data A and the data B is calculated. The difference is $k\Sigma(-W^2-2W\cdot X+2W\cdot V_{th}-(-W^2+2W\cdot V_{th}))=k\Sigma(-2W\cdot X)$. That is, offset components other than the product of the image data (X) and the weight coefficient (W) can be eliminated.

The circuit 201 can read the data A and the data B. Note that the calculation of the difference between the data A and the data B can be performed by the circuit 301, for example.

Here, the weights supplied to the entire pixel block 200 function as a filter. As the filter, a convolutional filter of a convolutional neural network (CNN) can be used, for example. Alternatively, an image processing filter such as an edge extraction filter can be used. As examples of the edge extraction filter, a Laplacian filter illustrated in FIG. 9A, a Prewitt filter illustrated in FIG. 9B, a Sobel filter illustrated in FIG. 9C, and the like can be given.

In the case where the number of pixels 400 included in the pixel block 200 is 3×3, elements of the edge extraction filter can be assigned and supplied as weights to the pixels 400. As described above, to calculate the data A and the data B, data obtained when imaging is performed, data obtained when imaging is not performed, and data obtained by adding weights to the respective data can be utilized for the calculation. Here, the data obtained when imaging is performed and the data obtained when imaging is not performed are data to which weights are not added and can also be referred to as data obtained by adding a weight 0 to all the pixels 400.

The edge extraction filters illustrated as examples in FIG. 9A to FIG. 9C are filters where the sum ($\Sigma\Delta W/N$, where N is the number of elements) of elements (weights: $\Delta W$) is 0. Therefore, without additional operation of supplying $\Delta W=0$ from another circuit, the operation of obtaining $\Sigma\Delta W/N$ enables data corresponding to the data obtained by adding $\Delta W=0$ to all the pixels 400 to be acquired.

This operation corresponds to turning on the transistors 450 (the transistors 450a to 450o) provided between the pixels 400 (see FIG. 7). By turning on the transistors 450, the node FDW in each of the pixels 400 is short-circuited through the wiring 417. At this time, charge accumulated in the node FDW in each of the pixels 400 is redistributed, and in the case where the edge extraction filters illustrated as examples in FIG. 9A to FIG. 9C are used, the potential of the node FDW ($\Delta W$) becomes 0 or substantially 0. Thus, the data corresponding to the data obtained by adding $\Delta W=0$ can be acquired.

Note that in the case of rewriting weights ($\Delta W$) by supplying charge from a circuit outside the pixel array 300, it takes time to complete rewriting owing to the capacitance of the long-distance wiring 411 or the like. In contrast, the pixel block 200 is a minute region, and the wiring 417 has a short distance and small capacitance. Therefore, weights ($\Delta W$) can be rewritten at high speed by the operation of redistributing charge accumulated in the nodes FDW in the pixel block 200.

In the pixel block 200 illustrated in FIG. 7, a structure where the transistor 450a to the transistor 450f are electrically connected to different gate lines (a wiring 413a to a wiring 413f) is illustrated. With this structure, the conductions of the transistor 450a to the transistor 450f can be controlled independently of each other, and the operation of obtaining $\Sigma\Delta W/N$ can be performed selectively.

For example, in the case of using a filter illustrated in FIG. 9B, FIG. 9C, or the like, there are some pixels where $\Delta W=0$ is initially supplied. Assuming that $\Sigma\Delta W/N=0$, the pixels where $\Delta W=0$ is supplied may be excluded from the target of summation. The exclusion of the pixels eliminates the need of supplying a potential for operating some of the transistors 450a to the transistor 450f, which can reduce power consumption.

Product-sum operation result data output from the circuit 201 is sequentially input to the circuit 301. The circuit 301 may have a variety of arithmetic functions in addition to the above-described function of calculating the difference between the data A and the data B. For example, the circuit 301 can have a structure similar to that of the circuit 201. Alternatively, the function of the circuit 301 may be replaced by software processing.

In addition, the circuit 301 may include a circuit that performs arithmetic operation of an activation function. A comparator circuit can be used as the circuit, for example. A comparator circuit outputs a result of comparing input data and a set threshold as binary data. In other words, the pixel blocks 200 and the circuit 301 can operate as some components of a neural network.

Data output from the circuit 301 is sequentially input to the circuit 302. The circuit 302 can have a structure including a latch circuit, a shift register, and the like, for example. With this structure, parallel—serial conversion can be performed and data input in parallel can be output to a wiring 311 as serial data.

[Pixel Structure Example]

Figure 10A:
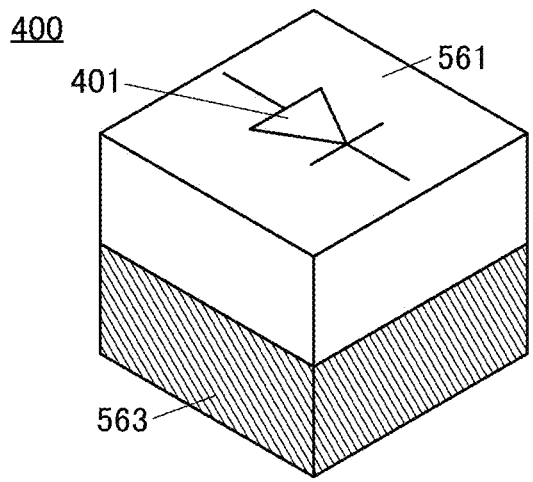
FIG. 10A is a diagram illustrating a pixel structure example.

FIG. 10A is a diagram illustrating a structure example of the pixel 400. The pixel 400 can have a stack structure of a layer 561 and a layer 563.

Figure 10B:
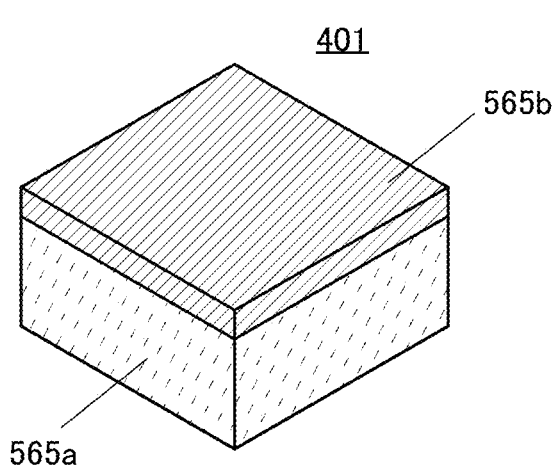
FIG. 10B to FIG. 10D are diagrams each illustrating a structure example of a photoelectric conversion device.

The layer 561 includes the photoelectric conversion device 401. The photoelectric conversion device 401 can include a layer 565a and a layer 565b, as illustrated in FIG. 10B. Note that a layer may be rephrased as a region, depending on the case.

The photoelectric conversion device 401 illustrated in FIG. 10B is a pn-junction photodiode; for example, a p-type semiconductor can be used for the layer 565a, and an n-type semiconductor can be used for the layer 565b. Alternatively, an n-type semiconductor may be used for the layer 565a, and a p-type semiconductor may be used for the layer 565b.

The pn junction photodiode can be formed typically using single crystal silicon.

Figure 10C:
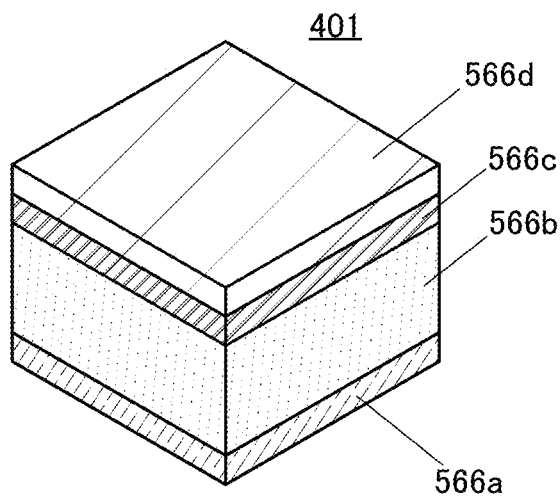

In addition, the photoelectric conversion device 401 included in the layer 561 may have a stack of a layer 566a, a layer 566b, a layer 566c, and a layer 566d, as illustrated in FIG. 10C. The photoelectric conversion device 401 illustrated in FIG. 10C is an example of an avalanche photodiode; the layer 566a and the layer 566d correspond to electrodes, and the layer 566b and the layer 566c correspond to a photoelectric conversion portion.

The layer 566a is preferably a low-resistance metal layer or the like. For example, aluminum, titanium, tungsten, tantalum, silver, or a stack thereof can be used.

A conductive layer having a high light-transmitting property with respect to visible light is preferably used as the layer 566d. For example, indium oxide, tin oxide, zinc oxide, indium tin oxide, gallium zinc oxide, indium gallium zinc oxide, graphene, or the like can be used. Note that a structure in which the layer 566d is omitted can also be employed.

The layer 566b and the layer 566c of the photoelectric conversion portion can be used to form a pn-junction photodiode containing a selenium-based material in a photoelectric conversion layer, for example. A selenium-based material, which is a p-type semiconductor, is preferably used for the layer 566b, and gallium oxide or the like, which is an n-type semiconductor, is preferably used for the layer 566c.

A photoelectric conversion device containing a selenium-based material has characteristics of high external quantum efficiency with respect to visible light. In the photoelectric conversion device, electrons can be greatly amplified with respect to the amount of incident light by utilizing avalanche multiplication. In addition, a selenium-based material has a high light-absorption coefficient and thus has advantages in production; for example, a photoelectric conversion layer can be manufactured using a thin film. A thin film of a selenium-based material can be formed by a vacuum evaporation method, a sputtering method, or the like.

As a selenium-based material, crystalline selenium such as single crystal selenium or polycrystalline selenium, amorphous selenium, a compound of copper, indium, and selenium (CIS), a compound of copper, indium, gallium, and selenium (CIGS), or the like can be used.

An n-type semiconductor is preferably formed using a material with a wide band gap and a light-transmitting property with respect to visible light. For example, zinc oxide, gallium oxide, indium oxide, tin oxide, a mixed oxide thereof, or the like can be used. In addition, these materials have a function of a hole-injection blocking layer, so that dark current can be decreased.

Figure 10D:
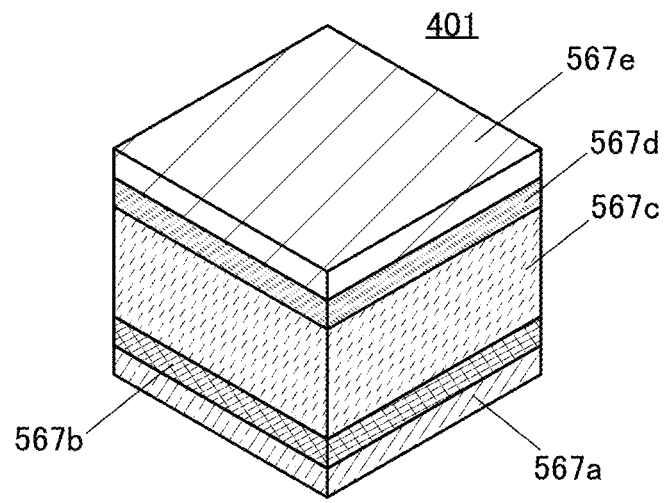

In addition, the photoelectric conversion device 401 included in the layer 561 may have a stack of a layer 567a, a layer 567b, a layer 567c, a layer 567d, and a layer 567e, as illustrated in FIG. 10D. The photoelectric conversion device 401 illustrated in FIG. 10D is an example of an organic photoconductive film; the layer 567a is a lower electrode, the layer 567e is an upper electrode having a light-transmitting property, and the layer 567b, the layer 567c, and the layer 567d correspond to a photoelectric conversion portion.

One of the layer 567b and the layer 567d of the photoelectric conversion portion can be a hole-transport layer. In addition, the other of the layer 567b and the layer 567d can be an electron-transport layer. Furthermore, the layer 567c can be a photoelectric conversion layer.

For the hole-transport layer, molybdenum oxide or the like can be used, for example. For the electron-transport layer, for example, fullerene such as $C_{60}$ or $C_{70}$, a derivative thereof, or the like can be used.

As the photoelectric conversion layer, a mixed layer of an n-type organic semiconductor and a p-type organic semiconductor (a bulk heterojunction structure) can be used.

For example, the layer 563 illustrated in FIG. 10A includes a silicon substrate. The silicon substrate can be provided with a Si transistor or the like. With the use of the Si transistor, the pixel 400 can be formed. In addition, a circuit 201 and a circuit 301 to a circuit 306 that are illustrated in FIG. 6 can be formed.

Next, a stack structure of the imaging device is described using a cross-sectional view. Note that components such as insulating layers and conductive layers are described below as examples, and other components may be further included. Alternatively, some components described below may be omitted. In addition, a stack structure described below can be formed by a bonding process, a polishing process, or the like as needed.

Figure 11:
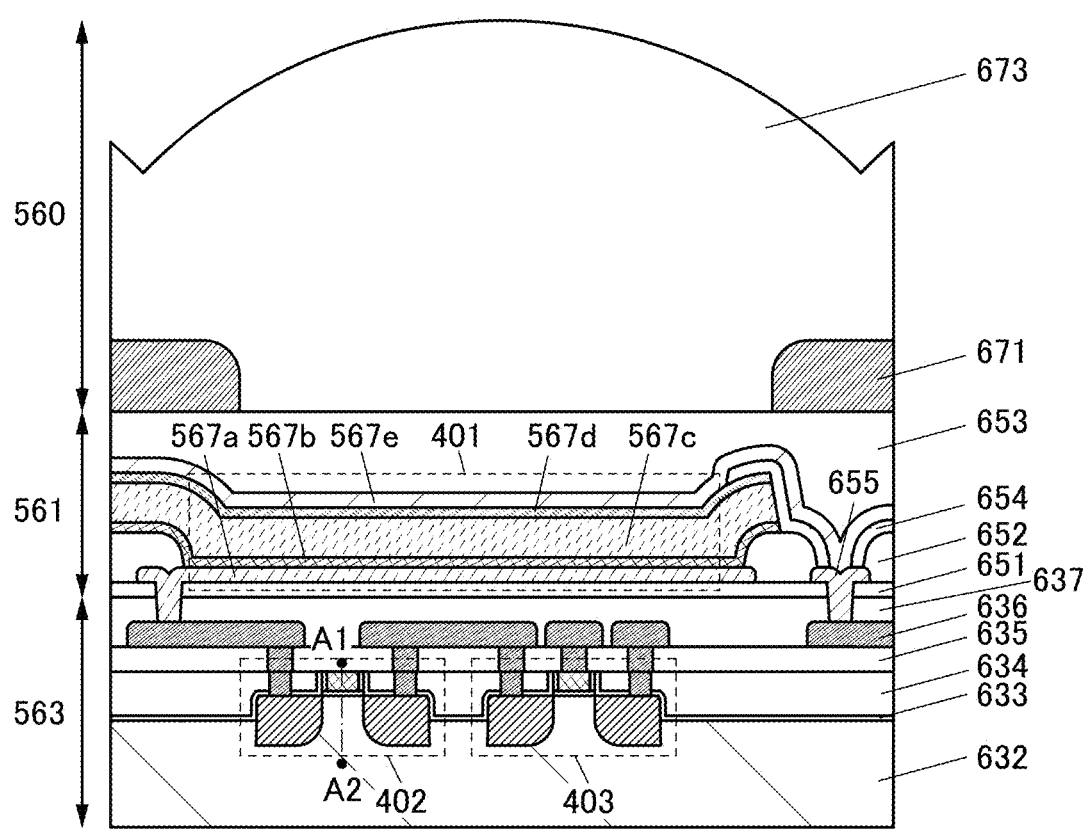
FIG. 11 is a cross-sectional view illustrating a structure example of an imaging device.

An imaging device with a structure illustrated in FIG. 11 includes a layer 560, the layer 561, and the layer 563. Although FIG. 11 illustrates the transistor 402 and the transistor 403 as components provided in the layer 563, other components such as the transistor 404 to the transistor 406 can also be provided in the layer 563.

A silicon substrate 632, an insulating layer 633, an insulating layer 634, an insulating layer 635, and an insulating layer 637 are provided in the layer 563. Moreover, a conductive layer 636 is provided.

The insulating layer 634, the insulating layer 635, and the insulating layer 637 have functions of interlayer insulating films and planarization films. The insulating layer 633 has a function of a protective film. The conductive layer 636 is electrically connected to the wiring 414 illustrated in FIG. 8.

As the interlayer insulating film and the planarization film, for example, an inorganic insulating film such as a silicon oxide film or an organic insulating film of an acrylic resin, a polyimide resin, or the like can be used. As the protective film, for example, a silicon nitride film, a silicon oxide film, an aluminum oxide film, or the like can be used.

For a conductive layer, a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, lanthanum, and the like; an alloy containing the above metal element; an alloy containing a combination of the above metal elements; or the like is selected as appropriate and used. The conductor is not limited to a single layer, and may be a plurality of layers including different materials.

Figure 12A:
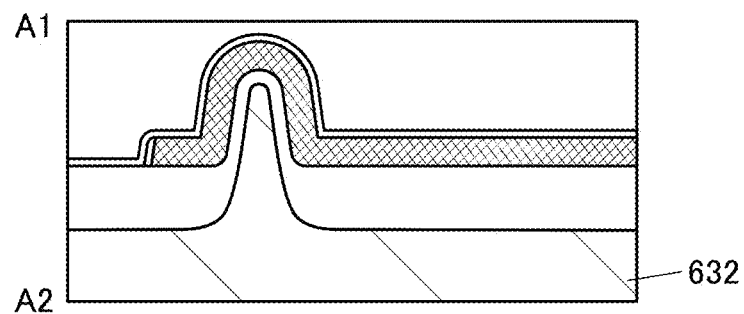
FIG. 12A to FIG. 12C are cross-sectional views each illustrating a transistor structure example.
Figure 12B:
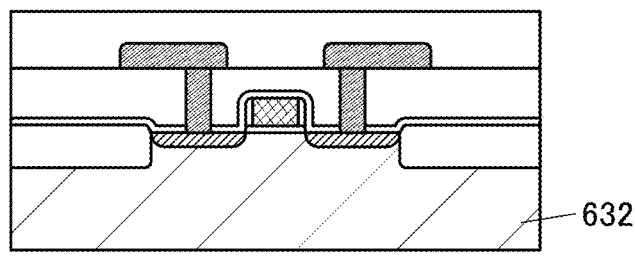

The Si transistors illustrated in FIG. 11 are FIN transistors each including a channel formation region in the silicon substrate. FIG. 12A illustrates a cross section in a channel width direction (a cross section along A1—A2 illustrated in the layer 563 in FIG. 11). Note that each of the Si transistors may be a planar transistor as illustrated in FIG. 12B.

Figure 12C:
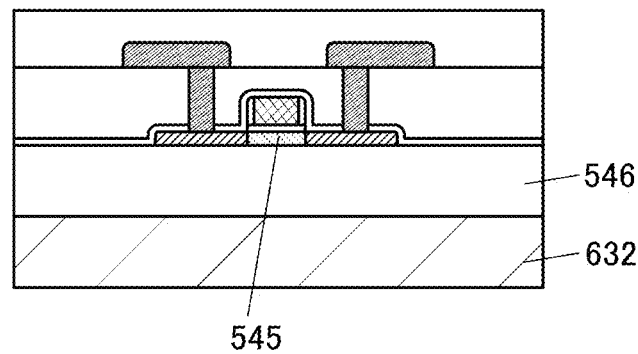

Alternatively, as illustrated in FIG. 12C, a transistor including a semiconductor layer 545 of a silicon thin film may be used. The semiconductor layer 545 can be single crystal silicon (SOI (Silicon on Insulator)) formed on an insulating layer 546 on the silicon substrate 632, for example.

The photoelectric conversion device 401 is provided in the layer 561. The photoelectric conversion device 401 can be formed over the layer 563. FIG. 11 illustrates a structure where the photoelectric conversion device 401 uses the organic optical conductive film illustrated in FIG. 10D as the photoelectric conversion layer. Note that here, the layer 567a is a cathode, and the layer 567e is an anode.

An insulating layer 651, an insulating layer 652, an insulating layer 653, an insulating layer 654, and a conductive layer 655 are provided in the layer 561.

The insulating layer 651, the insulating layer 653, and the insulating layer 654 have functions of interlayer insulating films and planarization films. In addition, the insulating layer 654 is provided to cover an end portion of the photoelectric conversion device 401, and also has a function of preventing short circuit between the layer 567e and the layer 567a. The insulating layer 652 has a function of an element isolation layer. An organic insulating film or the like is preferably used as the element isolation layer.

The layer 567a corresponding to the cathode of the photoelectric conversion device 401 is electrically connected to the one of the source and the drain of the transistor 402 included in the layer 563. The layer 567e corresponding to the anode of the photoelectric conversion device 401 is electrically connected to the conductive layer 636 provided in the layer 563 through the conductive layer 655.

The layer 560 is formed over the layer 561. The layer 560 includes a light-blocking layer 671 and a microlens array 673.

The light-blocking layer 671 can suppress entry of light into an adjacent pixel. As the light-blocking layer 671, a metal layer of aluminum, tungsten, or the like can be used. In addition, the metal layer and a dielectric film having a function of an anti-reflection film may be stacked.

The microlens array 673 is provided over the photoelectric conversion device 401. The photoelectric conversion device 401 directly under the lens is irradiated with light passing through an individual lens of the microlens array 673. When the microlens array 673 is provided, collected light can be incident on the photoelectric conversion device 401; thus, photoelectric conversion can be efficiently performed. The microlens array 673 is preferably formed using a resin, glass, or the like having a high light transmitting property with respect to light with a wavelength subjected to imaging.

Figure 13:
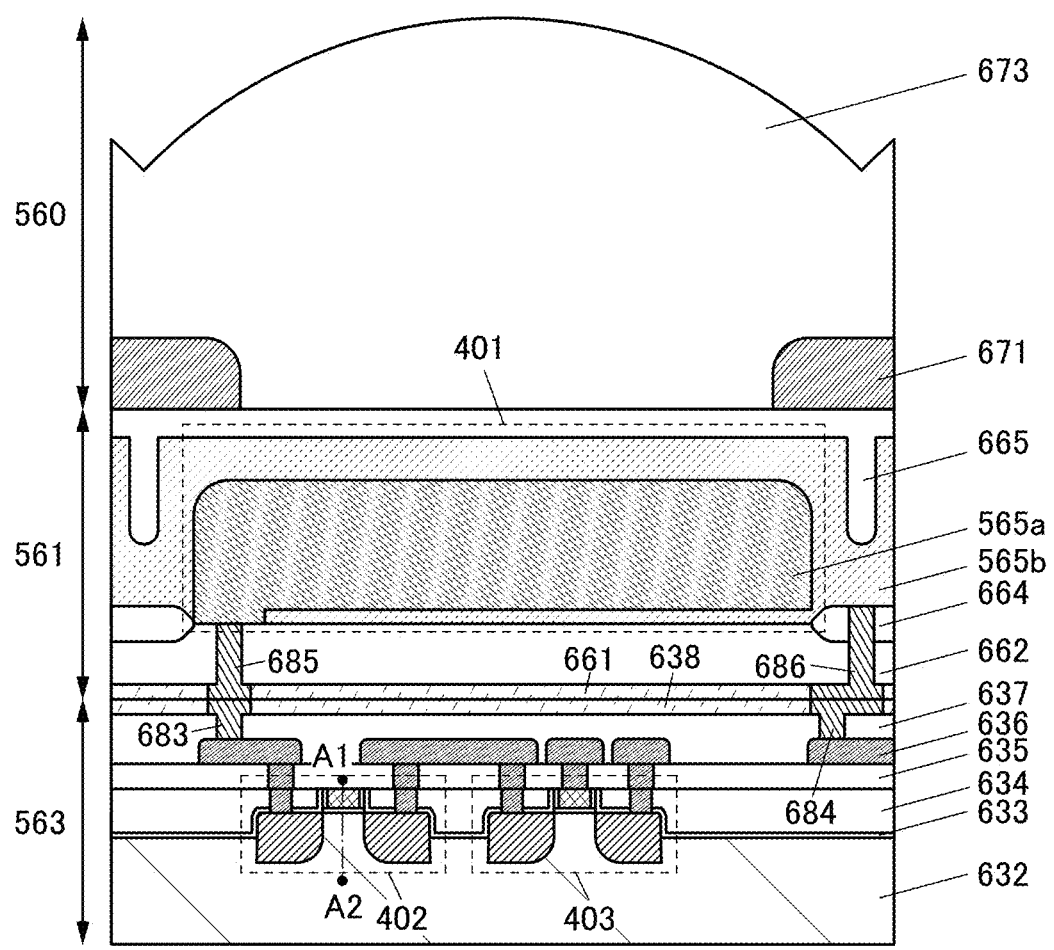
FIG. 13 is a cross-sectional view illustrating a structure example of an imaging device.

FIG. 13 is a modification example of the stack structure illustrated in FIG. 11. FIG. 13 differs from FIG. 11 in the structure of the photoelectric conversion device 401 included in the layer 561 and part of the structure of the layer 563. In the structure illustrated in FIG. 13, there is a bonding surface between the layer 561 and the layer 563.

The layer 561 includes the photoelectric conversion device 401, an insulating layer 661, an insulating layer 662, an insulating layer 664, an insulating layer 665, a conductive layer 685, and a conductive layer 686.

The photoelectric conversion device 401 is a pn junction photodiode formed on a silicon substrate and includes the layer 565b corresponding to a p-type region and the layer 565a corresponding to an n-type region. The photoelectric conversion device 401 is an embedded photodiode, which can suppress dark current and reduce noise with the thin p-type region (part of the layer 565b) provided on a surface side (current extraction side) of the layer 565a.

The insulating layer 661, the conductive layer 685, and the conductive layer 686 have functions of bonding layers. The insulating layer 662 has functions of an interlayer insulating film and a planarization film. The insulating layer 664 has a function of an element isolation layer. The insulating layer 665 has a function of suppressing carrier leakage.

The silicon substrate is provided with a groove that separates pixels, and the insulating layer 665 is provided on a top surface of the silicon substrate and in the groove. Providing the insulating layer 665 can suppress leakage of carriers generated in the photoelectric conversion device 401 to an adjacent pixel. In addition, the insulating layer 665 also has a function of suppressing entry of stray light. Therefore, color mixing can be suppressed with the insulating layer 665. Note that an anti-reflection film may be provided between the top surface of the silicon substrate and the insulating layer 665.

The element isolation layer can be formed by a LOCOS (LOCal Oxidation of Silicon) method. Alternatively, an STI (Shallow Trench Isolation) method or the like may be used to form the element isolation layer. As the insulating layer 665, for example, an inorganic insulating film of silicon oxide, silicon nitride, or the like or an organic insulating film of polyimide resin, acrylic resin, or the like can be used. Note that the insulating layer 665 may have a multilayer structure. Note that a structure without the element isolation layer may also be employed.

The layer 565a (corresponding to the n-type region and the cathode) of the photoelectric conversion device 401 is electrically connected to the conductive layer 685. The layer 565b (corresponding to the p-type region and the anode) is electrically connected to the conductive layer 686. The conductive layer 685 and the conductive layer 686 each include a region embedded in the insulating layer 661. Furthermore, surfaces of the insulating layer 661, the conductive layer 685, and the conductive layer 686 are planarized to be level with each other.

In the layer 563, the insulating layer 638 is formed over the insulating layer 637. In addition, a conductive layer 683 electrically connected to the one of the source and the drain of the transistor 402 and a conductive layer 684 electrically connected to the conductive layer 636 are formed.

The insulating layer 638, the conductive layer 683, and the conductive layer 684 have functions of bonding layers. The conductive layer 683 and the conductive layer 684 each include a region embedded in the insulating layer 638. Furthermore, surfaces of the insulating layer 638, the conductive layer 683, and the conductive layer 684 are planarized to be level with each other.

Here, main components of the conductive layer 683 and the conductive layer 685 are preferably formed using the same metal element, and main components of the conductive layer 684 and the conductive layer 686 are preferably formed using the same metal element. In addition, main components of the insulating layer 638 and the insulating layer 661 are preferably the same.

For the conductive layer 683 to the conductive layer 686, Cu, Al, Sn, Zn, W, Ag, Pt, Au, or the like can be used, for example. In particular, Cu, Al, W, or Au is used for easy bonding. In addition, for the insulating layer 638 and the insulating layer 661, silicon oxide, silicon oxynitride, silicon nitride oxide, silicon nitride, titanium nitride, or the like can be used.

That is, the same metal material described above is preferably used for the conductive layer 683 to the conductive layer 686. Furthermore, the same insulating material described above is preferably used for the insulating layer 638 and the insulating layer 661. With this structure, bonding where a boundary between the layer 563 and the layer 561 is a bonding position can be performed.

Note that the conductive layer 683 to the conductive layer 686 may each have a multilayer structure of a plurality of layers; in that case, outer layers (bonding surfaces) are formed of the same metal material. Furthermore, the insulating layer 638 and the insulating layer 661 may each have a multilayer structure of a plurality of layers; in that case, outer layers (bonding surfaces) are formed of the same insulating material.

With this bonding, the conductive layer 683 and the conductive layer 685 can be electrically connected to each other, and the conductive layer 684 and the conductive layer 686 can be electrically connected to each other. Moreover, connection between the insulating layer 661 and the insulating layer 638 with mechanical strength can be obtained.

For bonding metal layers to each other, a surface activated bonding method in which an oxide film, a layer adsorbing impurities, and the like on a surface are removed by sputtering processing or the like and cleaned and activated surfaces are brought into contact to be bonded to each other can be used. Alternatively, a diffusion bonding method in which surfaces are bonded to each other by using temperature and pressure together, or the like can be used. Both methods cause bonding at an atomic level, and therefore not only electrically but also mechanically excellent bonding can be obtained.

Furthermore, for bonding insulating layers to each other, a hydrophilic bonding method or the like can be used; in the method, after high planarity is obtained by polishing or the like, surfaces subject to hydrophilic treatment with oxygen plasma or the like are arranged in contact with and bonded to each other temporarily, and then dehydrated by heat treatment to perform final bonding. The hydrophilic bonding method also causes bonding at an atomic level; thus, mechanically excellent bonding can be obtained.

When the layer 563 and the layer 561 are bonded to each other, the metal layers and the insulating layers coexist on their bonding surfaces; therefore, the surface activated bonding method and the hydrophilic bonding method are performed in combination, for example.

For example, a method or the like can be used in which the surfaces are made clean after polishing, the surfaces of the metal layers are subjected to anti-oxidation treatment and then hydrophilicity treatment, and bonding is performed. Furthermore, hydrophilic treatment may be performed on the surfaces of the metal layers being hardly oxidizable metal such as Au. Note that a bonding method other than the above methods may be used.

The bonding allows the components included in the layer 563 to be electrically connected to the components included in the layer 561.

Figure 14:
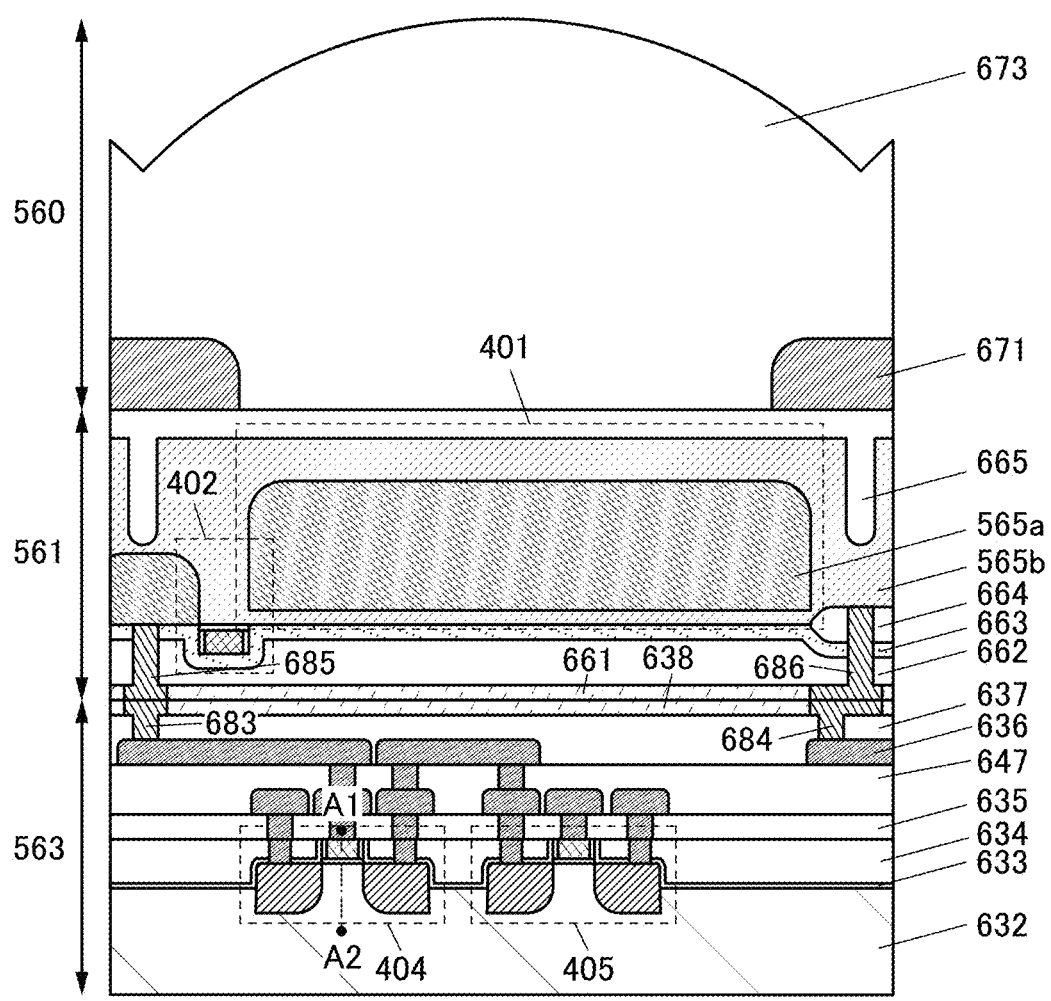
FIG. 14 is a cross-sectional view illustrating a structure example of an imaging device.

FIG. 14 is a modification example of the stack structure illustrated in FIG. 13. FIG. 14 differs from FIG. 13 in some of the structures of the layer 561 and the layer 563.

This modification example has a structure in which the transistor 402 included in the pixel 400 is provided in the layer 561. The transistor 402 that is covered with an insulating layer 663 is formed using a Si transistor in the layer 561. The one of the source and the drain of the transistor 402 is directly connected to the one electrode of the photoelectric conversion device 401. In addition, the other of the source and the drain of the transistor 402 is electrically connected to the node FD.

In an imaging device illustrated in FIG. 14, among transistors included in the imaging device, transistors excluding at least the transistor 402 are provided in the layer 563. Although FIG. 14 illustrates the transistor 404 and the transistor 405 as components provided in the layer 563, other components such as the transistor 403 and the transistor 406 can also be provided in the layer 563. Furthermore, in the layer 563 of the imaging device illustrated in FIG. 14, an insulating layer 647 is provided between the insulating layer 635 and the insulating layer 637. The insulating layer 647 has functions of an interlayer insulating film and a planarization film.

(Embodiment 5)

In this embodiment, a package where an imaging portion, what is called an image sensor chip, is put is described below.

FIG. 15A1 is an external perspective view of the top surface side of a package in which an image sensor chip is placed. The package includes a package substrate 410 to which an image sensor chip 452 (see FIG. 15A3) is fixed, a cover glass 420, an adhesive 430 for bonding them, and the like.

FIG. 15A2 is an external perspective view of the bottom surface side of the package. A BGA (Ball grid array) in which solder balls are used as bumps 440 on the bottom surface of the package is employed. Note that, without being limited to the BGA, an LGA (Land grid array), a PGA (Pin Grid Array), or the like may be included.

FIG. 15A3 is a perspective view of the package, in which parts of the cover glass 420 and the adhesive 430 are not illustrated. Electrode pads 460 are formed over the package substrate 410, and the electrode pads 460 and the bumps 440 are electrically connected via through-holes. The electrode pads 460 are electrically connected to the image sensor chip 452 through wires 470.

In addition, FIG. 15B1 is an external perspective view of the top surface side of a camera module in which an image sensor chip is placed in a package with a built-in lens. The camera module includes a package substrate 431 to which an image sensor chip 451 (FIG. 15B3 is fixed, a lens cover 432, a lens 435, and the like. Furthermore, an IC chip 490 (FIG. 15B3 having functions of a driver circuit, a signal conversion circuit, and the like of the imaging device is provided between the package substrate 431 and the image sensor chip 451; thus, a structure as an SiP (System in package) is included.

FIG. 15B2 is an external perspective view of the bottom surface side of the camera module. A QFN (Quad flat no-lead package) structure in which lands 441 for mounting are provided on the bottom surface and side surfaces of the package substrate 431 is included. Note that this structure is an example, and a QFP (Quad flat package) or the above BGA may be provided.

FIG. 15B3 is a perspective view of the module, in which parts of the lens cover 432 and the lens 435 are not illustrated. The lands 441 are electrically connected to electrode pads 461, and the electrode pads 461 are electrically connected to the image sensor chip 451 or the IC chip 490 through wires 471.

The image sensor chip placed in a package having the above form can be easily mounted on a printed board or the like, and the image sensor chip can be incorporated in a variety of semiconductor devices and electronic devices.

This embodiment can be combined with the description of the other embodiments as appropriate.

(Embodiment 6)

With the use of an imaging device using the embodiment described above, an imaging device that is suitable for a vehicle performing semi-autonomous driving is provided.

In Japan, the automation level of a driving system for vehicles such as motor vehicles is defined in four levels, from Level 1 to Level 4. Level 1 allows automation of any of acceleration, steering, and braking and is called a driving safety support system. Level 2 allows automation of a plurality of operations among acceleration, steering, and braking at the same time and is called a semi-autonomous driving system (also referred to as semi-autonomous driving). Level 3 allows automation of all of acceleration, steering, and braking, where a driver handles driving only in case of emergency, and is also called a semi-autonomous driving system (also referred to as semi-autonomous driving). Level 4 allows automation of all of acceleration, steering, and braking and is called fully autonomous driving where a driver is rarely in charge of driving.

In this specification, a novel structure or a novel system mainly premised on semi-autonomous driving in Level 2 or Level 3 is proposed.

In order to display warnings notifying a driver of the danger in accordance with circumstances obtained from a variety of cameras or sensors, the area of a display region adequate for the number of cameras or the number of sensors is necessary.

Figure 16A:
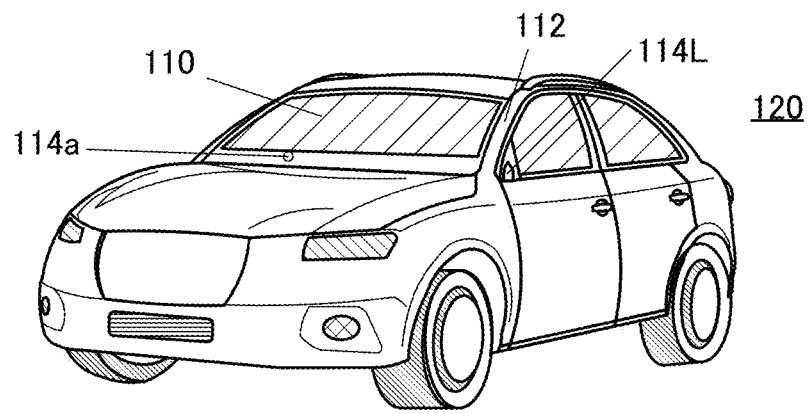
FIG. 16A is a diagram illustrating appearance of a vehicle.
Figure 16B:
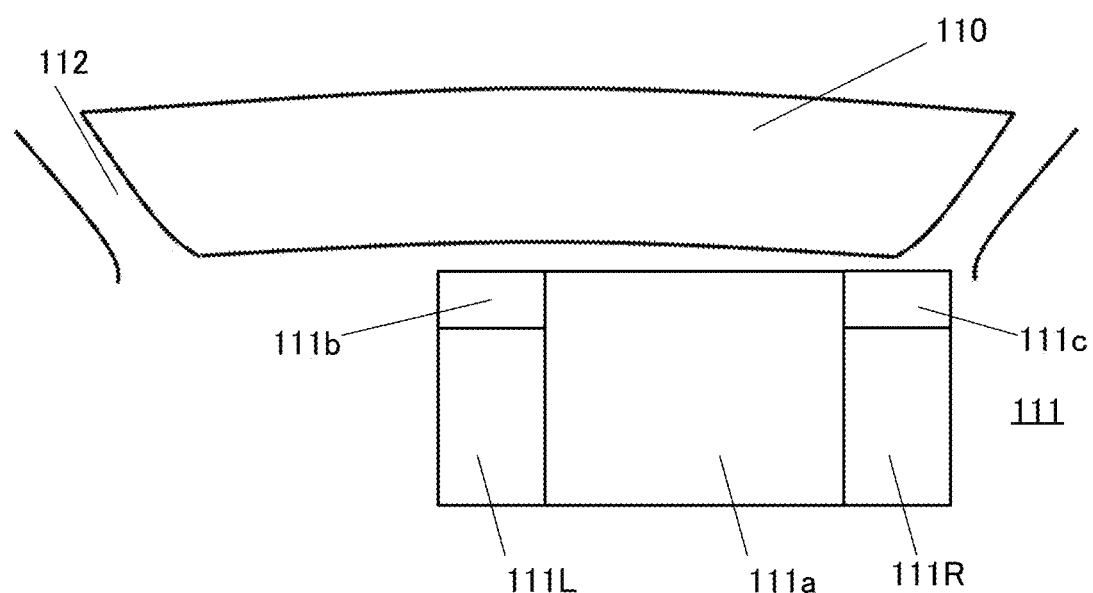
FIG. 16B is a schematic diagram when a windshield direction is seen from the inside of the vehicle.

In addition, FIG. 16A illustrates an exterior view of a vehicle 120. Note that FIG. 16A also illustrates examples of positions where a front image sensor 114a and a left-side image sensor 114L are provided. Furthermore, FIG. 16B is a schematic diagram illustrating the field of front view of a driver seen from the inside of a vehicle. A windshield 110 is positioned in an upper part of the field of view of the driver, and a display device 111 having a display screen is provided in a lower part of the field of view.

The windshield 110 is in the upper part of the field of view of the driver, and the windshield 110 is sandwiched between pillars 112. Although an example where the front image sensor 114a is provided in a position close to the field of view of the driver is illustrated in FIG. 16A, without particular limitation, the front image sensor 114a may be provided on a front grille or a front bumper. Furthermore, although an example of a right-hand-drive vehicle is illustrated in this embodiment, there is no particular limitation. In the case of a left-hand-drive vehicle, the front image sensor 114a may be provided in accordance with the position of the driver.

The image sensor chip described in Embodiment 5 is preferably used as at least one of these image sensors.

The driver mainly looks at the display device 111 to perform acceleration, steering, and braking and checks the outside of the vehicle from the windshield as an aid. As the display device 111, any one of a liquid crystal display device, an EL (Electro Luminescence) display device, and a micro LED (Light Emitting Diode) display device is used. Here, an LED chip whose one side size is larger than 1 mm is called a macro LED, an LED chip whose one side size is larger than 100 µm and smaller than or equal to 1 mm is called a mini LED, and an LED chip whose one side size is smaller than or equal to 100 µm is called a micro LED. It is particularly preferable to use a micro LED as an LED element applied to a pixel. The use of a micro LED can achieve an extremely high-resolution display device. The display device 111 preferably has higher resolution. The pixel density of the display device 111 can be a pixel density of higher than or equal to 100 ppi and lower than or equal to 5000 ppi, preferably higher than or equal to 200 ppi and lower than or equal to 2000 ppi.

For example, a center part 111a of the display screen of the display device displays an image obtained from an imaging device provided at the front outside the vehicle. In addition, parts 111b and 111c of the display screen perform meter display such as display of speed, estimated distance to empty, and abnormality warning. Furthermore, video of the left side outside the vehicle is displayed in a lower left part 111L of the display screen, and video of the right side outside the vehicle is displayed on a lower right part 111R of the display screen.

The lower left part 111L of the display screen and the lower right part 111R of the display screen can eliminate side view mirror protrusions that protrude greatly outside the vehicle by computerization of side view mirrors (also referred to as door mirrors).

The display screen of the display device 111 may be configured to be operated by touch input so that part of video is enlarged or reduced, a display position is changed, or the area of the display region is expanded, for example.

Because an image on the display screen of the display device 111 is a composite of data from a plurality of imaging devices or sensors, the image is created with an image signal processing device such as a GPU.

With the use of the imaging system described in Embodiment 1, a highlighted image can be output to the display device 111 by acquisition of monochrome image data with a wide dynamic range and colorization performed by inference using an image signal processing device or the like. For example, even in a tunnel, it is possible to perform coloring a dark human figure and output an image with a highlighted human figure.

By using AI as appropriate, the driver can mainly look at a displayed image on the display device, that is, an image utilizing the image sensors and the AI in operating the vehicle and look at the front of the windshield as an aid. Operating the vehicle while looking at images utilizing the AI, rather than driving with only the driver's eyes, can be safe driving. Moreover, the driver can operate the vehicle with a sense of security.

Note that the display device 111 can be used around a driver's seat (also referred to as a cockpit portion) in various types of vehicles such as a large-sized vehicle, a middle-sized vehicle, and a small-sized vehicle. Furthermore, the display device 111 can also be used around the driver's seat in a vehicle such as an airplane or a ship.

In addition, although this embodiment describes an example where the front image sensor 114a is placed below the windshield, there is no particular limitation. An imaging camera illustrated in FIG. 17 may be placed on a hood or around an in-vehicle rearview mirror.

Figure 17:
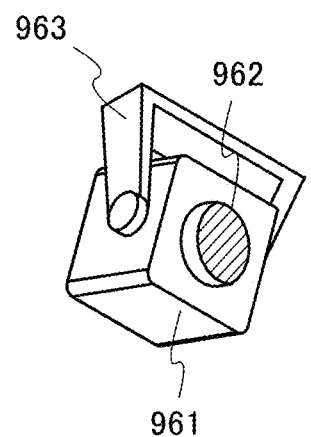
FIG. 17 is an example of an applied product illustrating one embodiment of the present invention.

The imaging camera in FIG. 17 can also be referred to as a dashboard camera, which includes a housing 961, a lens 962, a support portion 963, and the like. When a double-sided tape or the like is attached to the support portion 963, the imaging camera can be placed in the windshield, the hood, a rearview mirror support, or the like.

When the imaging camera in FIG. 17 is provided with the image sensor, driving video can be stored in the inside of the imaging camera or an in-vehicle storage device. In addition, in the case of not using a color filter, an image with a wider dynamic range obtained from monochrome image data can be stored in the storage device, which reduces capacity occupied by the storage device as compared to the case of capturing a color image. Furthermore, a usage may be employed in which monochrome image data stored in the storage device is subjected to colorization by the method described in this embodiment 1 to be displayed only when a user wishes to view color image data not in a real time but after driving.

This embodiment can be freely combined with the other embodiments.

REFERENCE NUMERALS

10: data acquisition device, 11: solid-state imaging element, 14: memory portion, 15: large-scale storage device, 16: neural network portion, 17: time information acquisition device, 18: storage portion, 19: display portion, 20: image processing device, 21: imaging system, 110: windshield, 111: display device, 111*a*: central part, 111*b*: part, 111*c*: part, 111L: lower left part, 111R: lower right part, 112: pillar, 114*a*: front image sensor, 114L: left-side image sensor, 120: vehicle, 200: pixel block, 201: circuit, 202: capacitor, 203: transistor, 204: transistor, 205: transistor, 206: transistor, 207: resistor, 211: wiring, 212: wiring, 213: wiring, 215: wiring, 216: wiring, 217: wiring, 218: wiring, 219: wiring, 300: pixel array, 301: circuit, 302: circuit, 303: circuit, 304: circuit, 305: circuit, 306: circuit, 311: wiring, 400: pixel, 401: photoelectric conversion device, 402: transistor, 403: transistor, 404: transistor, 405: transistor, 406: transistor, 407: capacitor, 410: package substrate, 411: wiring, 412: wiring, 413: wiring, 413*a* to 413*f*: wiring, 413*g* to 413*j*: wiring, 414: wiring, 415: wiring, 417: wiring, 420: cover glass, 421: wiring, 422: wiring, 423: wiring, 424: wiring, 430: adhesive, 431: package substrate, 432: lens cover, 435: lens, 440: bump, 441: land, 450: transistor, 450*a* to 450*g*: transistor, 450*f* to 450*j*: transistor, 451: image sensor chip, 452: image sensor chip, 460: electrode pad, 461: electrode pad, 470: wire, 471: wire, 490: IC chip, 545: semiconductor layer, 546: insulating layer, 560: layer, 561: layer, 563: layer, 565*a*: layer, 565*b*: layer, 566*a*: layer, 566*b*: layer, 566*c*: layer, 566*d*: layer, 567*a*: layer, 567*b*: layer, 567*c*: layer, 567*d*: layer, 567*e*: layer, 632: silicon substrate, 633: insulating layer, 634: insulating layer, 635: insulating layer, 636: conductive layer, 637: insulating layer, 638: insulating layer, 647: insulating layer, 651: insulating layer, 652: insulating layer, 653: insulating layer, 654: insulating layer, 655: conductive layer, 661: insulating layer, 662: insulating layer, 664: insulating layer, 665: insulating layer, 671: light-blocking layer, 673: micro lens array, 683: conductive layer, 684: conductive layer, 685: conductive layer, 686: conductive layer, 961: housing, 962: lens, and 963: support portion.

The invention claimed is:

1. An imaging system comprising:
a solid-state imaging element without a color filter;
a storage device; and
a learning device,
wherein the solid-state imaging element acquires monochrome image data,
wherein training data to be used in the learning device is converted into an HSV color space and is a second set of data obtained by thinning out based on statistics of a first set of data used as a median of a saturation histogram, and
wherein the learning device performs colorization of the monochrome image data using data stored in the storage device, thereby creating colored image data.

2. The imaging system according to claim 1, wherein the solid-state imaging element is a back-illuminated CMOS image sensor chip.

3. The imaging system according to claim 1, wherein the first set of data used as the median of the saturation histogram is classified into 256 gray scales, and data with greater than or equal to 175 gray scales is not used as training data to be used in the learning device.

4. The imaging system according to claim 1, wherein the second set of data is less than or equal to one two hundred fiftieth of the first set of data.

* * * * *